(12) United States Patent
Tsusaka

(10) Patent No.: US 7,615,956 B2
(45) Date of Patent: Nov. 10, 2009

(54) ROBOT

(75) Inventor: Yuji Tsusaka, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 472 days.

(21) Appl. No.: 11/658,089

(22) PCT Filed: Jul. 22, 2005

(86) PCT No.: PCT/JP2005/013886

§ 371 (c)(1),
(2), (4) Date: Jan. 22, 2007

(87) PCT Pub. No.: WO2006/009317

PCT Pub. Date: Jan. 26, 2006

(65) Prior Publication Data

US 2009/0001919 A1 Jan. 1, 2009

(30) Foreign Application Priority Data

Jul. 22, 2004 (JP) .............................. 2004-214343

(51) Int. Cl.
*B25J 9/02* (2006.01)
(52) U.S. Cl. ........................... 318/568.11; 318/568.12; 700/245; 700/249; 901/1; 901/2; 901/14; 901/17; 901/19
(58) Field of Classification Search ............ 318/568.11, 318/568.12; 700/245, 249; 901/1, 2, 14, 901/17, 19
See application file for complete search history.

(56) References Cited

U.S. PATENT DOCUMENTS

| 4,566,843 | A | * | 1/1986 | Iwatsuka et al. | ............. 414/680 |
| 4,662,814 | A | * | 5/1987 | Suzuki et al. | ............... 414/730 |
| 4,697,472 | A | * | 10/1987 | Hiyane | .................... 74/490.02 |
| 4,828,453 | A | * | 5/1989 | Martin et al. | ................ 414/738 |
| 4,865,376 | A | * | 9/1989 | Leaver et al. | ................ 294/111 |
| 4,946,380 | A | * | 8/1990 | Lee | ............................. 623/24 |
| 4,955,918 | A | * | 9/1990 | Lee | ............................. 623/24 |
| 5,049,797 | A | * | 9/1991 | Phillips | ................. 318/568.16 |
| 5,080,682 | A | * | 1/1992 | Schectman | ................... 623/64 |
| 5,092,646 | A | * | 3/1992 | Smallridge | .................. 294/111 |
| 5,195,388 | A | * | 3/1993 | Zona et al. | ............... 74/479.01 |
| 5,656,904 | A | * | 8/1997 | Lander | .................. 318/568.12 |

FOREIGN PATENT DOCUMENTS

| JP | 4-300179 | 10/1992 |
| JP | 5-285871 | 11/1993 |
| JP | 2003-340768 | 12/2003 |

OTHER PUBLICATIONS

International Search Report, Oct. 24, 2005.

* cited by examiner

*Primary Examiner*—Rita Leykin
(74) *Attorney, Agent, or Firm*—Finnegan, Henderson, Farabow, Garrett & Dunner, LLP

(57) ABSTRACT

A robot, wherein the operating amounts of the first and second actuators are adjusted according to a torque necessary for maintaining a body member and an end member at specified angles in a mechanism in which the body member (361) and the end member (363) are rotatably connected to each other and first and second wires (366) connected to the end member are advanced and retreated by the first and second actuator (368).

7 Claims, 11 Drawing Sheets

ROBOT

CROSS-REFERENCE TO RELATED APPLICATION

The present application claims priority to Japanese Patent Application No. 2004-214343 filed on Jul. 22, 2004, the contents of which are hereby incorporated by reference into the present application.

BACKGROUND OF THE INVENTION

1. Field of the Invention

The present invention relates to a robot in which a distal side member is rotatably jointed to a body side member, and at least two wires are connected to the distal side member. The robot is adapted such that a wire is moved back and forth by an actuator to rotate the distal side member with respect to the body side member.

2. Description of the Related Art

In recent years, humanoid robots or animal-shaped robots have been developed actively. In such robots, the distal side member is rotatably jointed to the body side member via a joint. As a joint angle (the rotation angle of the distal side member with respect to the body side member) is adjusted, the robots walk, carry an object or operate an object.

Here, the term "body side member and distal side member" means, for example, "body part and head part", "body part and upper-arm part", "upper-arm part and forearm part", "forearm part and palm part", "palm part and finger part", "body part and thigh part", "thigh part and lower leg part", "lower leg part and foot part", etc. Here, the foot part means a member on the distal side of an ankle joint.

The robot has an actuator which actuates each joint. When an actuator is disposed in each joint, it is difficult to reduce the size and weight of the joint. Therefore, a technique for providing an actuator on the body side member and connecting a distal side member to the actuator with a wire has been developed.

In this technique, an end of a first wire is connected to a portion of the distal side member located in one side of a rotation center, and an end of a second wire is connected to a portion of the distal side member located in the other side of the rotation center. By pulling the first wire and loosening the second wire, the distal side member is rotated in a first direction. By loosening the first wire and pulling the second wire, the distal side member is rotated in a second direction. The operation of the joint can be adjusted by adjusting an operation amount of the actuator that moves the other end of the first wire back and forth, and an operation amount of the actuator that moves the other end of the second wire back and forth.

For example, a robot arm is disclosed in Japanese Patent Application Publication No. H04-300179. The robot arm has a plurality of joints and a plurality of wires which operate the group of joints. In the robot arm, the tension of each wire and the torque of each joint are adjusted by using actuators (referred to as a wire drive system in this publication). In this publication, a technique for adjusting the joint angle of each joint is not described.

BRIEF SUMMARY OF THE INVENTION

When the joint angle is adjusted with wires, wire stretching cannot be ignored. For example, when an external force to rotate the joint (hereinafter referred to as the load torque of a joint) is applied to the distal side member, the wires will stretch according to their tensions and consequently the wire stretching will change the joint angle. Therefore, when a particular joint angle is instructed, the deviation between the instructed joint angle and an actual joint angle will vary according to the load torque of a joint, as long as the operation amounts of the actuators are uniformly determined from the instructed joint angle. For this reason, in order to accurately adjust the joint angle to an instructed angle, it is necessary to calculate a modified instruction angle which is obtained by modifying the instruction angle depending on the deviation between the instruction angle and the actual angle, and to determine the operation amount of the actuator from the modified instruction angle. That is, it is necessary to feed back the deviation in the joint angle when determining the operation amount of the actuator.

In a case where the operation amount of the actuator is determined based upon the modified instruction angle, when the instruction angle is modified to a slight excess with respect to the magnitude of the deviation, it will be possible to rapidly reduce the deviation caused in the joint angle. On the other hand, when the instruction angle is modified too much with respect to the magnitude of the deviation, the actuator may operate excessively with respect to the deviation of the joint angle, and consequently the joint angle cannot be accurately adjusted to the instructed angle. Therefore, It is necessary to determine a rate (so-called a feedback gain) such that the instruction angle is modified with respect to the magnitude of a deviation on the basis of the mechanical structure of a joint or the operation needed for a joint.

While the robot operates, each joint acts in various ways. For example, in a bipedal robot, while one foot part makes contact with the ground, the other foot part moves forward as an idling leg. Also, when the other foot part makes contact with the ground, the first foot part moves forward as an idling leg. The bipedal robot walks by repeating these operations. Since each leg becomes a grounded leg or an idling leg, the load torque, for example, applied to an ankle joint changes every moment. When a large feedback gain is used to adjust the joint angle of the ankle joint, the joint angle can be accurately adjusted to an instructed angle while the ankle joint is an ankle joint on the grounded leg, but the joint angle may oscillate while the ankle joint is an ankle joint on the idling leg. In contrast, when a small feedback gain is used, the joint angle can be adjusted correctly while the ankle joint is an ankle joint on the idling leg, but a deviation in the joint angle will not be removed sufficiently while the ankle joint is an ankle joint on the idling leg. A large feed back gain should be selected if joint angle oscillation is permissible, or a small feed back gain should be selected if a degree of deviation in the joint angle is permissible.

At least two wires, i.e., a first wire which is pulled to change the joint angle in a first direction, and a second wire which is pulled to change the joint angle in a second direction, are used for a joint. Also, a torque is generated in the joint by the first wire and the second wire so as to resist a load torque of the joint. The tension in the first wire and the second wire varies according to the load torque of the joint. For example, when the load torque of the joint is a torque which rotates the joint in the first direction, the tension of the first wire becomes smaller than the tension of the second wire. However, when the load torque is a torque which changes the joint angle in the second direction, the tension of the first wire becomes larger than the tension of the second wire.

The relationship between the amount of change in the tension of a wire and the amount of change in the extension of the wire (the rigidity of the wire) is not constant, unlike an ideal elastic object. FIG. 11 is a graph showing the relationship between the tension of a wire and the stretch thereof. In the graph in FIG. 11, the abscissa axis represents the tension of the wire and the ordinate axis represents the degree of wire stretching. The gradient of the graph represents rigidity, and a larger gradient represents a smaller rigidity. In a range where the tension is small, like range A in the figure, the rigidity is relatively low and is apt to change. In a range where the tension is large, like range B in the figure, the rigidity is relatively high and is stable. This mainly results from the structure of the wire in which a number of strands are twisted.

While the robot operates, the tension of the first wire and the tension of the second wire change every moment. This means that the rigidity of the first wire and the rigidity of the second wire change every moment. This change in the rigidity means that the relationship between the operation amount of the actuator which moves the other end of a wire back and forth and the amount of change in the joint angle caused by the operation amount is apt to change. When the rigidity of the wire is high and stable, for example, in a state where the tension of the wire is large, even when a change occurs in the tension of the Mire, the relationship between the operation amount of the actuator and the amount of change in the joint angle is stabilized. On the other hand, when the rigidity of the wire is low and unstable in a state where the tension of the wire is small, when a change occurs in the tension of the wire, the relationship between the operation amount of an actuator and the amount of change in the joint angle is apt to change. For this reason, even if the deviation of a joint angle is merely fed back to the operation amount of each actuator that moves a wire back and forth, the joint angle cannot be adjusted correctly. For example, if the joint angle is controlled using a large feedback gain, the joint angle may oscillate in a state where the tension of the wire is small. On the other hand, if a small feedback gain is used, deviation in the joint angle will not be sufficiently removed in a state where the tension of the wire is large. A large feed back gain should be selected if joint angle oscillation is permissible, or a small feed back gain should be selected if a degree of deviation in the joint angle is permissible.

The present invention solves the above problems. The present invention provides a technique for appropriately adding the deviation in a joint angle to the operation amounts of the actuators that move the wires back and forth, and makes it possible to accurately adjust the joint angle to an instructed angle.

A robot embodied by the present invention is provided with a body side member, a distal side member, a first wire, a first actuator, a second wire, a second actuator, a first controller, a second controller, and an adjustor.

The distal side member is rotatably jointed to the body side member. An end of the first wire is connected to a portion of the distal side member located in one side of a rotation center. The first wire is constructed to rotate the distal side member in a first direction when the first wire is pulled. The first actuator is constructed to move the other end of the first wire back and forth. An end of the second wire is connected to a portion of the distal side member located in the other side of the rotation center. The second wire is constructed to rotate the distal side member in a second direction when the second wire is pulled. The second actuator is constructed to move the other end of the second wire back and forth.

The first controller is constructed to instruct an operation amount to the first actuator. Here, the first controller calculates a first modified instruction angle by modifying an instructed rotation angle of the distal side member based upon a deviation between the instructed rotation angle and an actual rotation angle of the distal side member, and calculates the operation amount of the first actuator based upon the first modified instruction angle. The second controller is constructed to instruct an operation amount to the second actuator. Here, the second controller calculates a second modified instruction angle by modifying the instructed rotation angle of the distal side member based upon the deviation between the instructed rotation angle and the actual rotation angle of the distal side member, and calculates the operation amount of the second actuator based upon the second modified instruction angle.

The adjustor is constructed to adjust, in accordance with the torque required to maintain the rotation angle of the distal side member at the instructed rotation angle, the magnitude of the modification performed by the first controller and/or the second controller.

In this robot, the operation of the first actuator and the second actuator is adjusted so that the actual rotation angle of the distal side member may become the instructed rotation angle. The operation amounts of the first actuator and the second actuator are calculated by the first controller and the second controller, respectively. The first controller and the second controller calculate the operation amount of the first actuator and the operation amount of the second actuator on the basis of the modified instruction angle which is obtained by modifying an instructed rotation angle for the distal side member depending on the deviation between the instructed rotation angle and an actual rotation angle of the distal side member. Accordingly, the deviation between the instructed rotation angle and the actual rotation angle is added to the operation amount of the first actuator and the operation amount of the second actuator. The first actuator and the second actuator operate in a direction such that the deviation in the actual rotation angle of the distal side member is removed.

The load torque, which is applied to the distal side member and changes the actual rotation angle of the distal side member, varies according to the operation of the robot. For this reason, a torque required to maintain the actual rotation angle of the distal side member at an instructed rotation angle also varies according to the operation of the robot. When the load torque is large, the first wire and the second wire may extend or retract substantially, and a large deviation in the actual rotation angle of the distal side member may result. In such a case, it is preferable that the first actuator and the second actuator perform larger operation with respect to the caused deviation. On the other hand, when the load torque is small, the first wire and the second wire merely expand or contract slightly, and a large deviation in the actual rotation angle of the distal side member does not result. In such a case, when the first actuator and the second actuator perform large operation with respect to the caused deviation, they may, for example, cause the distal side member to vibrate.

In this robot, the magnitude of the instructed rotation angle modification performed by the first controller or the second controller is adjusted according to the magnitude of the torque required to maintain the actual rotation angle of the distal side member at the instructed rotation angle. That is, the magnitude of the instructed rotation angle modification performed by the first controller or the second controller changes according to the magnitude of the load torque. Accordingly, for example, when the load torque is large, the operation amount of the first actuator or the operation amount of the second actuator can be more substantially increased with respect to the deviation between the instructed rotation angle and the actual rotation angle. On the other hand, when the load torque is small, the operation amount of the first actuator or the operation amount of the second actuator can be partly reduced with respect to a deviation between the instructed rotation angle and the actual rotation angle.

According to this robot, a deviation in the rotation angle of the distal side member can be more appropriately utilized to modify the operation amount of the first actuator and the operation amount of the second actuator. The actual rotation angle of the distal side member can be correctly adjusted to the instructed rotation angle.

In the aforementioned robot, it is preferable that the robot further comprises a storage device for storing an expected value of the torque required to maintain the actual rotation angle of the distal side member at the instructed rotation angle.

A torque required to maintain the actual rotation angle of the distal side member at the instructed rotation angle can be estimated in advance on the basis of the expected operation of the robot. The first controller and the second controller can more accurately adjust the magnitude of the instructed rotation angle modification if the required torque is estimated in advance, based upon the expected operation.

Another robot embodied by the present invention is provided with a body side member, a distal side member, a first wire, a first actuator, a second wire, a second actuator, a first controller, a second controller, and an adjustor.

The distal side member is rotatably jointed to the body side member. An end of the first wire is connected to a portion of the distal side member located in one side of a rotation center. The first wire is constructed to rotate the distal side member in a first direction when the first wire is pulled. The first actuator is constructed to move the other end of the first wire back and forth. An end of the second wire is connected to a portion of the distal side member located in the other side of the rotation center. The second wire is constructed to rotate the distal side member in a second direction when the second wire is pulled. The second actuator is constructed to move the other end of the second wire back and forth.

The first controller is constructed to instruct an operation amount to the first actuator. Here, the first controller calculates a first modified instruction angle by modifying an instructed rotation angle of the distal side member based upon the deviation between the instruction rotation angle and an actual rotation angle of the distal side member, and it calculates the operation amount of the first actuator based upon the first modified instruction angle. The second controller is constructed to instruct an operation amount to the second actuator. Here, the second controller calculates a second modified instruction angle by modifying the instructed rotation angle of the distal side member based upon the deviation between the instructed rotation angle and the actual rotation angle of the distal side member, and calculates the operation amount of the second actuator based upon the second modified instruction angle.

The adjustor is constructed such that it will adjust the magnitude of modification performed by the second controller so it is larger than the magnitude of modification performed by the second controller when the tension of the first wire is larger than the tension of the second wire. When the tension of the second wire is larger than the tension of the first wire, the adjuster will adjust the magnitude of modification performed by the second controller so it is larger than the magnitude of modification performed by the first controller In this robot, the deviation in the actual rotation angle of the distal side member will be added to the operation amount of the first actuator and the operation amount to the second actuator, and the first actuator and the second actuator operate in a direction in which the deviation in the actual rotation angle of the distal side member is removed.

Depending upon the operation of the robot, the tension of the first wire and the tension of the second wire varies, and consequently their rigidity also varies. In many cases, it is necessary to assign different tensions to each wire in order to maintain a distal side member at the instructed rotation angle while a lord torque is applied. At this time, although the rigidity of one wire is high and stable, the rigidity of the other wire is low and unstable.

In this robot, the magnitude of the modification of the first controller and the magnitude of the modification of the second controller can be modified on the basis of the tension of the first wire and the second wire, respectively. Accordingly, for an actuator which moves a wire with a larger tension, the deviation in the rotation angle of the distal side member can be added to the operation amount of the actuator such that it has a substantial effect. Conversely, for the other actuator which moves the other wire, whose tension is smaller, the deviation in the rotation angle of the distal side member can be added to the operation amount such that it has only a slight effect.

In this robot, when a deviation in the actual rotation angle of the distal side member occurs, the actuator which moves the wire whose tension is larger can be operated to a substantial degree with respect to the deviation. Further, the other actuator which moves the other wire whose tension is smaller can be operated to a slight degree with respect to the deviation. Accordingly, the deviation of the actual rotation angle of the distal side member can be removed rapidly, and the distal side member can be prevented from vibration.

According to this robot, a deviation in the actual rotation angle of the distal side member can be more appropriately added to the operation amount of the first actuator and the operation amount of the second actuator. The actual rotation angle of the distal side member can be correctly adjusted to the instructed rotation angle.

It is preferable that the adjustor is constructed such that the magnitude of modification performed by either the first controller or the second controller is set to zero. That is, even when a deviation in the actual rotation angle of the distal side member occurs, the actuator which moves the wire whose tension is smaller is not operated.

Since the wire whose tension is small has a low rigidity, the wire itself is apt to stretch or contract. The actual rotation angle of the distal side member can be adjusted by moving only the wire whose tension is larger with the actuator, and consequently the other wire whose tension is smaller stretches or contracts passively. In this robot, the actuator, which is unstable in terms of the relationship between the operation amount and the amount of change in the actual rotation angle of the distal side member, is not operated unnecessarily.

It is also preferable that the adjustor is constructed such that it will adjust the magnitude of modification performed by the first controller to be proportional to the tension of the first wire, and will adjust the magnitude of modification performed by the second controller to be proportional to the tension of the second wire.

It becomes possible to more appropriately adjust the operation amount of each actuator with respect to the deviation in the actual rotation angle of the distal side member so that it corresponds to the magnitude of the tension of each wire.

In the aforementioned robot, it is preferable that the robot further comprises a storage device for storing an expected value of the tension of the first wire and/or the second wire.

The tension of the first wire or the second wire can be estimated in advance on the basis of the expected operation of the robot. If the tension of the first wire or the tension of the second wire, estimated from the expected operation of the robot, is stored in advance, the first controller and the second controller can more accurately adjust the magnitude of the modification by which the instructed rotation angle is modified.

It is also preferable that the robot further comprises a sensor for measuring the tension of the first wire and/or the second wire.

Accordingly, the first controller and the second controller can more accurately adjust the magnitude of the modification by which the instructed rotation angle is modified on the basis of the actual tension of each wire. Even when an unexpected external force acts on the robot, it becomes possible to correctly adjust the actual rotation angle of the distal side member to the instructed rotation angle.

According to the present invention, it is possible to provide a technique for appropriately adding the deviation in a joint angle to the operation amount of an actuator which moves a wire back and forth, and to accurately adjust the joint angle to the instructed rotation angle.

DETAILED DESCRIPTION OF THE INVENTION

Features of Embodiment 1

Figure 1:
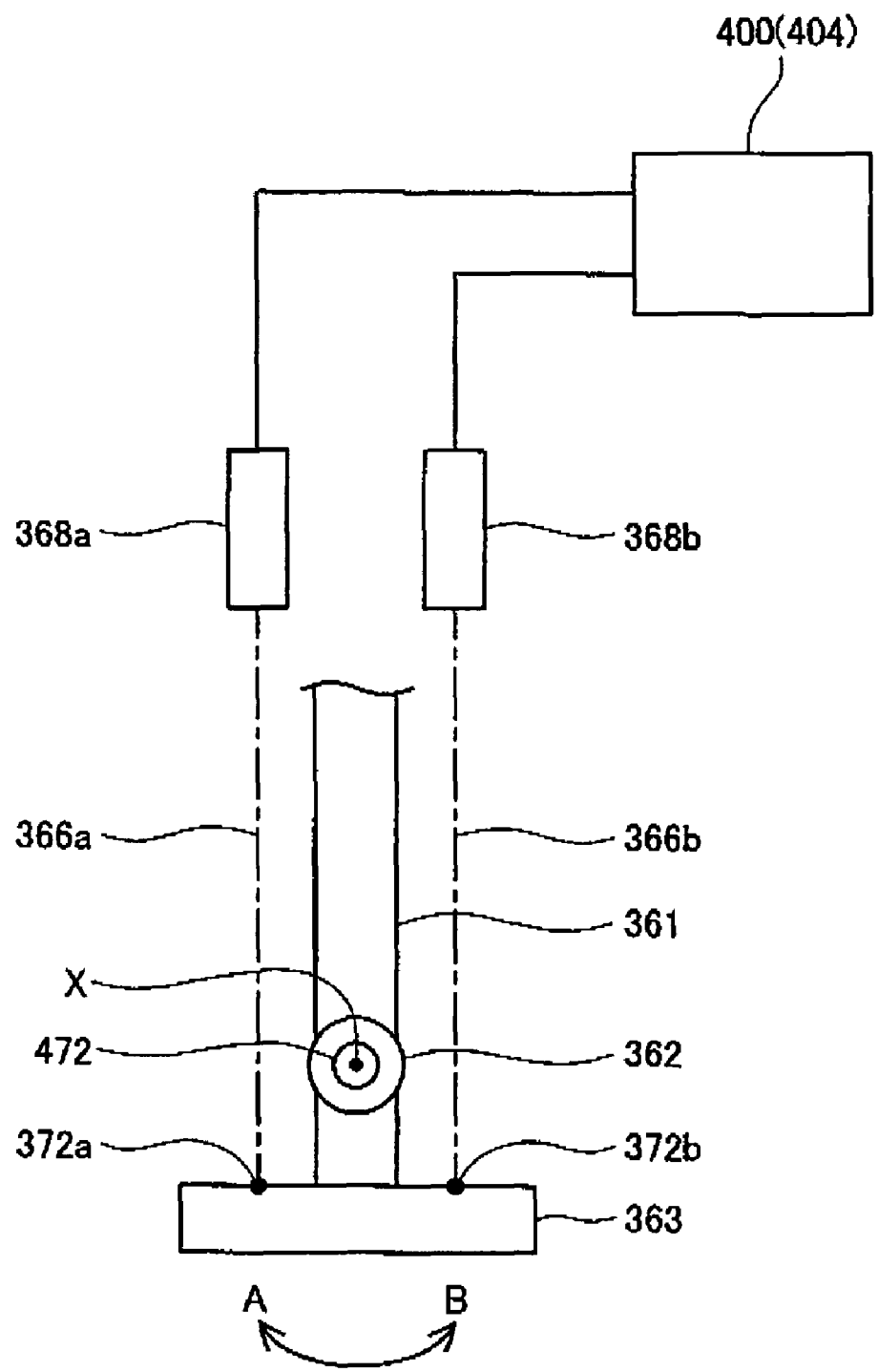
FIG. 1 shows the basic configuration of each joint of a robot of an embodiment

FIG. 1 is a view schematically showing the configuration of a joint part of a robot. As shown in FIG. 1, the robot has a body side member 361, a distal side member 363, and a joint 362 which rotatably joints the distal side member 363 to the body side member. The distal side member 363 is adapted to be rotatable around an X axis with respect to the body side member 361.

The robot has a first wire 366a an end of which is connected to a connection point 372a of the distal side member 363 located in one side of a rotation center (x in the figure), and a second wire 366b an end of which is connected to a connection point 372b of the distal side member 363 located in the other side of the rotation center. By pulling the first wire 366a and loosening the second wire 366b, the distal side member 363 rotates in an A direction in the figure. By loosening the first wire 366a and pulling the second wire 366b, the distal side member 363 rotates in a B direction in the figure.

The robot has a first actuator 368a which moves the other end of the first wire 366a back and forth, and a second actuator 368b which moves the other end of the second wire 366b back and forth. When the first actuator 368a moves the other end of the first wire 366a back and forth, and the second actuator 368b moves the other end of the second wire 366b back and forth, the robot can change the angle of the distal side member 363 with respect to the body side member 361. Hereinafter, the angle of the distal side member 363 with respect to the body side member 361 is referred to as the joint angle of the joint 362.

The robot has an encoder 472 disposed in the vicinity of the joint 362. The encoder 472 is a sensor which detects an actual joint angle θmx of the joint 362. Hereinafter, the actual joint angle of the joint is often referred to as an actual angle.

The robot has a controller 400 which controls an operation amount of the first actuator 368a and an operation amount of the second actuator 368b. The controller 400 controls the operation amounts of the actuators 368a and 368b to thereby control the joint angle of the joint 362.

Figure 2:
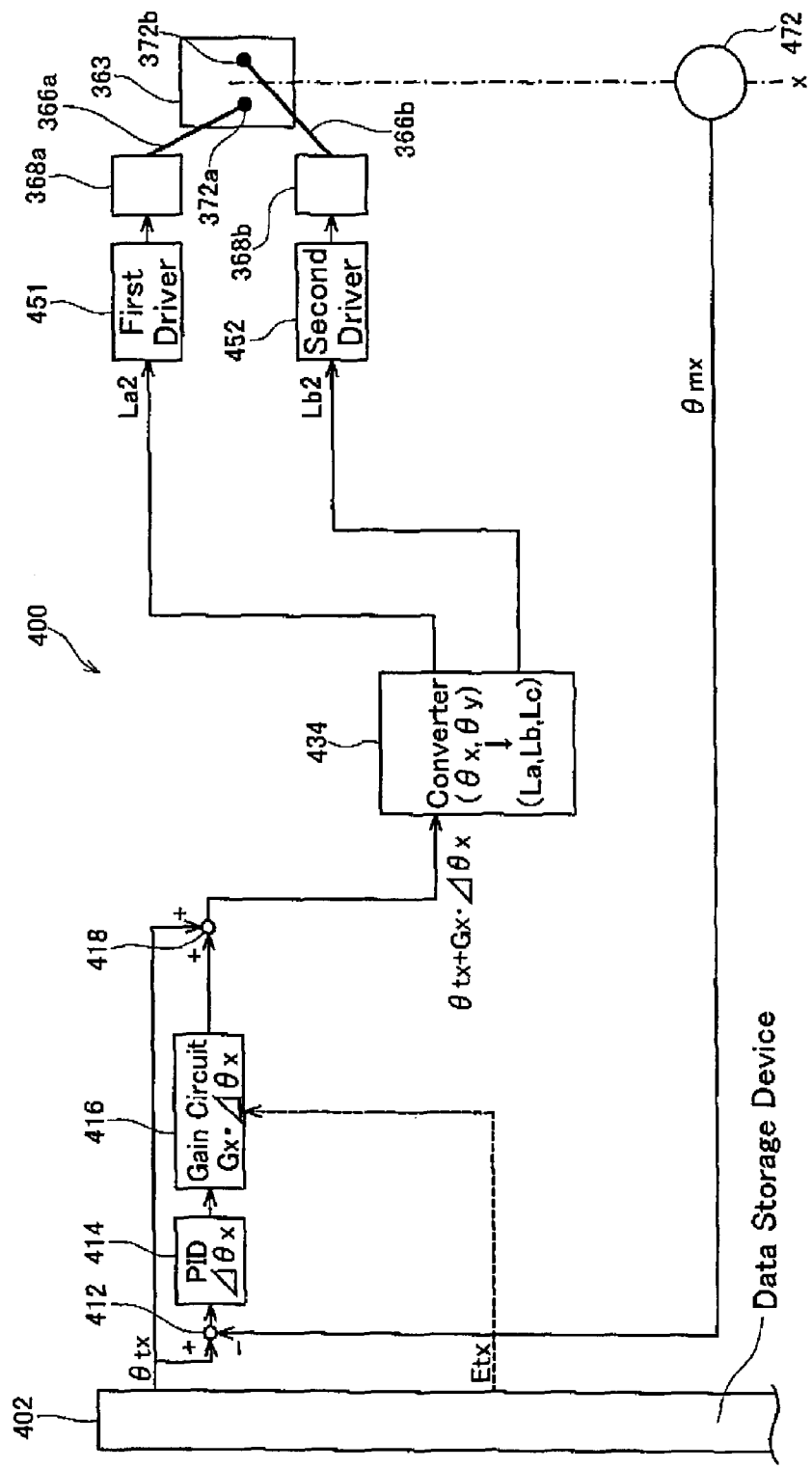
FIG. 2 shows a major configuration of the controller of the embodiment 1.

FIG. 2 shows the configuration of the controller 400. The controller 400 has major features of the controller 200 provided to the robot 10 of the embodiment 1 as described below. The controller 400 has a data storage device 402 as shown in FIG. 2. The data storage device 402 stores data required to operate the robot. The data storage device 402 stores joint angle data and load torque data, for example.

The joint angle data is data which describes a joint angle (instructed angle) of each joint when the robot actuates each joint to make a predetermined operation thereof over time. The joint angle data is prepared in advance by an operator of the robot, etc., and is taught in advance to the robot. The controller 400 controls the operation amount of actuators so that the joint angle of each joint will become an angle instructed by the joint angle data. Hereinafter, a joint angle described in the joint angle data is often referred to as an instructed angle.

The load torque data is data which describes a load torque of each joint which is expected when the robot actuates each joint to make a predetermined operation thereof over time. The load torque of a joint is an external torque applied from the outside, and is a torque to change a joint angle. That is, the load torque does not include a torque applied by wires.

The controller 400 has a differentiator 412, a proportional integral derivative control (PID control) circuit 414, a gain circuit 416, an adder 418, and a converter 434. The differentiator 412, the PID control circuit 414, the gain circuit 416, and the adder 418 are connected in series, and the data storage device 402 and the converter 434 are connected to each other by the series circuits. The gain circuit 416 is directly connected even to the data storage device 402. The adder 418 is directly connected even to the data storage device 402. The encoder 472 is connected to the differentiator 412.

The differentiator 412 inputs an instructed angle θtx of the joint 362 from the data storage device 402, inputs an actual angle θmx of the joint 362 from the encoder 472, and outputs a deviation angle (θtx−θmx) therebetween. The deviation angle (θtx−θmx) represents an error between the instructed angle θtx and the actual angle θmx, and shows an angle required to modify the actual angle of the joint 362 to the instructed angle.

The PID control circuit 414 inputs the deviation angle (θtx−θmx) from the differentiator 412, and outputs a modified deviation angle Δθx which is obtained by increasing and decreasing the deviation angle. If the magnitude (absolute value) |θtx−θmx| of the deviation angle is large, the PID control circuit 414 will output a modified deviation angle Δθx which is modified so that the deviation angle may be increased. The PID control circuit 414 cumulatively calculates the deviation angle, and outputs a modified deviation angle Δθx which is modified so that a larger cumulative value of the deviation angle may result in a further increased deviation angle. Further, the PID control circuit 414 calculates the change rate of the deviation angle, and outputs a modified deviation angle Δθx which is modified so that a smaller change rate of the deviation angle may result in a further increased deviation angle. In addition, increasing the deviation angle means that the (plus/minus) sign of the deviation angle (θtx−θmx) is kept unchanged, while the absolute value thereof is modified so that it may become large. A general-purpose PID control circuit, etc. can be used as the PID control circuit 414.

The gain circuit 416 inputs the modified deviation angle Δθx from the PID control circuit 414, inputs a load torque θtx of the joint 362 from the data storage device 202, and outputs an amplified deviation angle Gx·Δθx. This coefficient Gx is a coefficient for amplifying the modified deviation angle Δθx. The gain circuit 416 will set a larger amplification coefficient Gx as the input load torque Etx is larger. The gain circuit 416 multiplies the input modified deviation angle Δθx by the set amplification coefficient Gx.

The adder 418 inputs the instructed angle θtx of the joint 362 from the data storage device 402, inputs the amplified deviation angle Gx·Δθx from the gain circuit 416, and outputs a modified instruction angle (θtx+Gx·Δθx). The adder 418 obtains the modified instruction angle (θtx+Gx·Δθx) by adding the instructed angle θtx to the amplified deviation angle Gx·Δθx. The modified instruction angle (θtx+Gx·Δθx) outputted by the adder 418 is an angle that has been modified from the instructed angle θtx with respect to the deviation between the instructed angle θtx and the actual angle θtm concerning the joint 362. Here, as the load torque of the joint 362 is larger, the magnitude of the modification will be larger.

The converter 434 inputs the modified instruction angle from the adder 414, and calculates a modified effective length La2 for the first wire 366a and a modified effective length Lb2 for the second wire 366b form the modified instruction angle. The effective length of a wire is the length of a wire projected from an actuator. If the effective lengths of the first wire 366a and the second wire 366b are adjusted to the modified effective length La2 and Lb2 calculated from the modified instruction angle, respectively, the joint angle of the joint 362 will be adjusted to the modified instruction angle.

As shown in FIG. 2, the controller 400 has a first driver 451 which controls the first actuator 368a, and a second driver 452 which controls the second actuator 368b. The first driver 451 and the second driver 452 are connected to the converter 434. The first actuator 368a is connected to the first driver 451. The second actuator 368b is connected to the second driver 452.

The first driver 451 inputs the modified effective length La2 for the first wire 366a calculated by the converter 434, and calculates an operation amount of the first actuator 368a on the basis of the input modified effective length La2. And then, the first driver 451 operates the first actuator 368a by the calculated operation amount. The first driver 451 stores a reference relationship between an operation amount of the first actuator 368a and a length by which the first wire 366a is moved back and forth by the operation amount (or, a distance by which the other end of the first wire 366a moves back and forth). The first driver 451 calculates the operation amount of the first actuator 368a on the basis of the modified effective length La2 and the stored reference relationship.

The second driver 452 stores a reference relationship between an operation amount of the second actuator 368b, and a length by which the second wire 366b is moved back and forth by the operation amount (or, a distance by which the other end of the second wire 366b moves back and forth). The second driver 452 inputs the modified effective length Lb2 for the second wire 366b calculated by the converter 434, and calculates an operation amount of the second actuator 368b from the input modified effective length Lb2. And then, the second driver 452 operates the second actuator 368b by the calculated operation amount.

As described above, the controller 400 can calculate the modified instruction angle (θtx+Gx·Δθx) by modifying the instructed angle θtx of the joint 362 based upon the deviation between the instructed angle θtx and the actual angle θmx of the joint 362, and can calculate the modified effective lengths La2, Lb2 for the wires 366a, 366b based upon the modified instruction angle (θtx+Gx·Δθx). Then, the controller 400 can calculate the operation amount of the first actuator 368a from the modified effective length La2, and can calculate the operation amount of the second actuator 368b from the modified effective length Lb2. Accordingly, the operation amounts of the actuators 368a, 368b is calculated with respect to the deviation in the joint angle of the joint 362. In the controller 400, when the deviation in the joint angle of the joint 362 occurs, the operation amount of the first actuator 368a and the second actuator 368b are calculated so that the deviation will be removed.

In the controller 400, when the instructed angle of the joint 362 is modified by the deviation between the instructed angle and the actual angle, the magnitude of the modification is adjusted by the PID control circuit 414 and the gain circuit 416. Particularly, the magnitude of the modification is adjusted by the gain circuit 416 so that a larger load torque of the joint 362 may result in a larger magnitude of the instruction angle modification. As a result, when the load torque of the joint 362 is larger, the operation amount of the first actuator 368a or the second actuator 368b will be adjusted to be larger with respect to the deviation in the joint angle of the joint 362.

While the robot operates, the joint 362 acts in various ways. For example, there is a case where the joint 362 operates to support the total weight of the robot, and there is also a case where the joint 362 operate to support only the weight of the distal side member 363. The load torque of the joint 362 varies according to the operation of the robot. When the load torque applied to the joint 362 is large, the first wire 366a and the second wire 366b will stretch or contract substantially, and a large deviation in the joint angle of the joint 362 may result. When the load torque of the joint 362 is larger, the controller 400 modifies the instructed angle more substantially with respect to the magnitude of the deviation. Therefore, when the load torque of the joint 362 is larger, the first actuator 368a and the second actuator 368b perform larger operation so that the deviation is removed. Therefore, the deviation in the joint angle of the joint 362 will be removed rapidly, and the joint angle is accurately adjusted to the instruction angle.

On the other hand, when the load torque of the joint 362 is small, the first wire 366a and the second wire 366b will stretch or contract slightly, and therefore a large deviation in the joint angle of the joint 362 does not occur. As the load torque of the joint 362 is smaller, the controller 400 modifies the instructed angle more slightly with respect to the magnitude of the deviation. Therefore, neither the first actuator 368a nor the second actuator 368b operates excessively. This prevents the joint angle of the joint 362 from vibrating, for example. Since the deviation occurs slightly, the deviation can be removed rapidly and the joint angle is accurately adjusted to the instructed angle.

The controller 400 can appropriately add the deviation in the joint angle of the joint 362 to the operation amount of the first actuator 368a or the second actuator 368b, thereby adjusting the joint angle of the joint 362 accurately to an instructed angle.

Features of Embodiment 2

Figure 3:
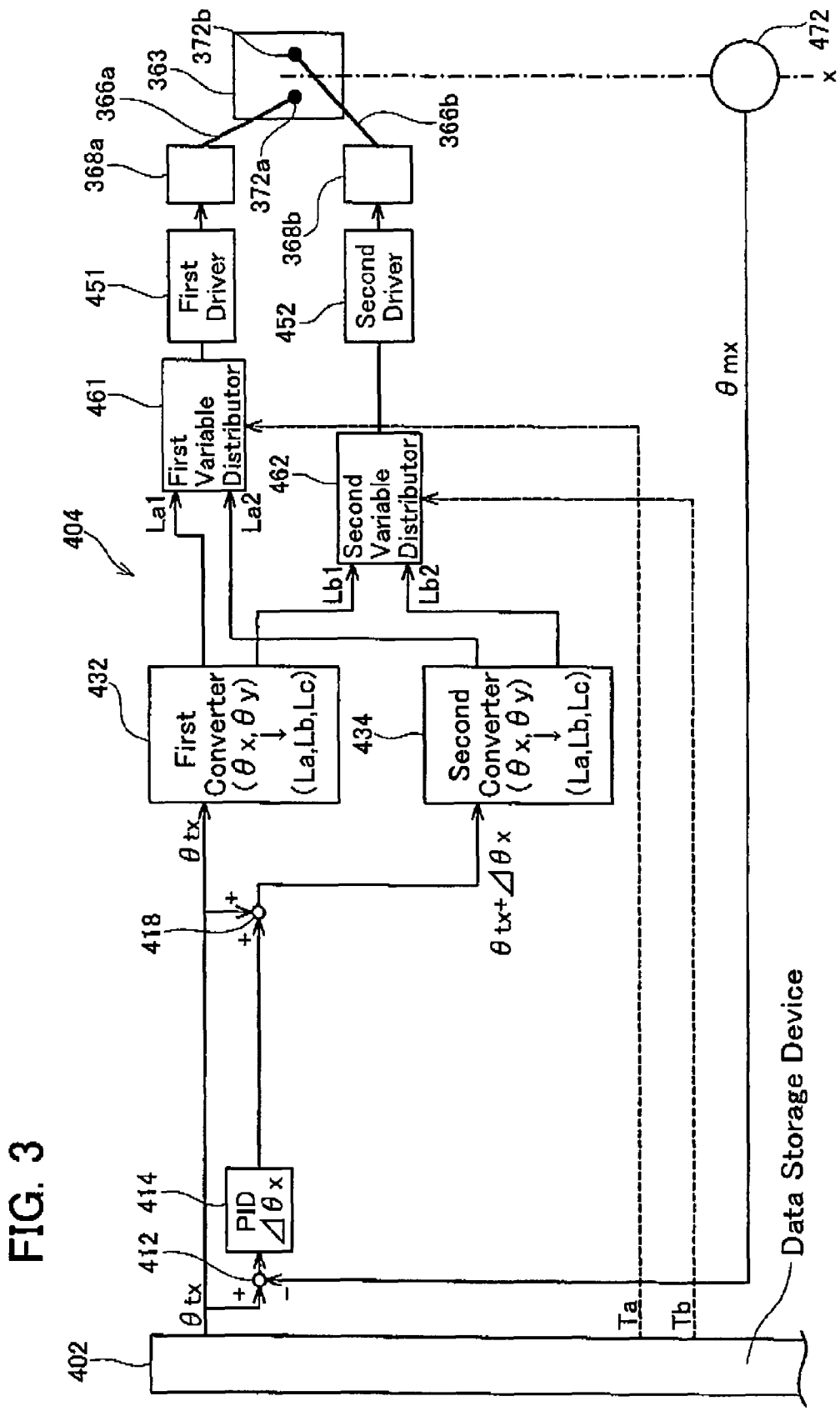
FIG. 3 shows a major configuration of the controller of the embodiment 2.

FIG. 3 shows a controller 404. The controller 404 has major features of the controller provided to the robot of the embodiment 2 as described below. The controller 404 can be used for controlling the operation amount of the first actuator 368a and the second actuator 368b shown in FIG. 1 similarly to the controller 400. The controller 404 can replace the controller 400 for controlling the robot shown in FIG. 1.

Hereinafter, although the controller 404 will be described, the same components as those of the controller 400 shown in FIG. 1 are denoted by the same reference numerals, and the detailed description thereof is omitted so as to avoid repeated description.

As shown in FIG. 3, the controller 404 has the data storage device 402. The data storage device 402 stores joint angle data and expected tension data The expected tension data is data which describes a tension expected to be generated in each wire when the robot actuates each joint to make a predetermined operation thereof over time.

The controller 404 has the differentiator 412, the PID control circuit 414, the adder 418, a first converter 432, and a second converter 434. The first converter 432 is connected to the data storage device 402. The differentiator 412, the PID control circuit 414, and the adder 418 are connected in series, and the data storage device 402 and the second converter 434 are connected to each other by the series circuits.

The adder 418 inputs an instructed angle $\Delta\theta x$ of the joint 362 from the data storage device 402, inputs a modified deviation angle $\Delta\theta x$ from the PID control circuit 414, and outputs a modified instruction angle ($\theta tx+\Delta\theta x$) obtained by adding the instructed angle $\theta tx$ to the modified deviation angle $\Delta\theta x$. The modified instruction angle ($\theta tx+\Delta\theta x$) output by the adder 418 is an angle which is obtained by modifying the instructed angle $\theta tx$ of the joint 362 according to the deviation between the instructed angle $\theta tx$ and the actual angle $\theta tx$.

The first converter 432 and the second converter 434 are almost the same as the converter 434 in the controller 400. Here, the first converter 432 inputs the instructed angle $\theta tx$ of the joint 362 from the data storage device 402, and calculates an expected effective length La1 for the first wire 366a and an expected effective length Lb1 for the second wire 366b from the instructed angle. The second converter 434 inputs the modified instruction angle ($\theta tx+\Delta\theta x$) from the adder 414, and calculates a modified effective length La2 for the first wire 366a and a modified effective length Lb2 for the second wire 366b from the modified instruction angle.

The controller 404 has a first variable distributor 461 and a second variable distributor 462. The first converter 432, the second converter 434, and the data storage device 402 are connected to the input part of the first variable distributor 461. The first driver 451 is connected to the output part of the first variable distributor 461. The first converter 432, the second converter 434, and the data storage device 402 are connected to the input part of the second variable distributor 462. The second driver 452 is connected to the output part of the second variable distributor 462.

The first variable distributor 461 inputs the expected effective length La1 for the first wire 366a from the first converter 432, inputs the modified effective length La2 for the first wire 366a from the second converter 434, and inputs an expected tension Ta of the first wire 366a from the data storage device 402. And then, the first variable distributor 461 calculates a distributed effective length from the input expected effective length La1 and modified effective length La2. The distributed effective length calculated by the first variable distributor 461 is a value between the expected effective length La1 and the modified effective length La2. And, the distributed effective length is set to be near to the modified effective length La2 as the tension of the first wire 366a is larger. The first variable distributor 461 input the expected tension Ta of the first wire 366a from the data storage device 202, and calculates the distributed effective length expressed by the following equation.

(Distributed effective length)=$La1+(La2-La1)\cdot k$ k in the above equation is 0 (zero)$\leq k\leq 1$, and is a coefficient proportional to the tension of the first wire 366a. The distributed effective length calculated by the first variable distributor 461 can be considered as a value which is modified by adding the deviation in the joint angle of the joint 362 to the expected effective length La1 calculated from the instruction angle of the joint 362. The magnitude of the modification becomes larger as the tension of the first wire 366a is larger, and especially, is proportional to the tension of the first wire 366a. The second variable distributor 462 calculates the distributed effective length ($Lb1+(Lb2-Lb1)\cdot k$) for the second wire 366b similarly to the first variable distributor 461. In addition, the coefficient k which is used for calculation by the second variable distributor 462 is determined from the tension of the second wire 366b, and differs from the coefficient k which is used for calculation by the first variable distributor 461.

The first driver 451 inputs the distributed effective length of the first wire 366a from the first variable distributor 461, and calculates an operation amount of the first actuator 368a from the distributed effective length. The operation amount calculated from the distributed effective length can be considered as an operation amount calculated from an angle which is obtained by modifying an instructed angle of the joint 362 according to the deviation angle between the instructed angle and the actual angle. The magnitude of the modification of the instructed angle will be larger as the tension of the first wire 366a is larger. The second driver 452 calculates an operation amount of the second actuator 368b similarly to the first driver 451. As a result, when the tension of the first wire 366a is larger than the tension of the second wire 366b, the first driver 451 calculates the operation amount from an angle which is obtained by modifying the instructed angle more substantially than the second driver 452. When the tension of the second wire 366b is larger than the tension of the first wire 366a, the second driver 452 calculates the operation amount from an angle which is obtained by modifying the instructed angle more substantially than the first driver 451. The first driver 451 and the second driver 452 operate the first actuator 368a and the second actuator 368b by the calculated operation amount, respectively.

The controller 404 calculates the expected effective length La1 for the first wire 366a and the expected effective length Lb1 for the second wire 366b from the instructed angle of the joint 362. The expected effective lengths La1 and Lb1 are calculated without considering the deviation in the joint angle of the joint 362. Further, the controller 404 calculates the modified effective length La2 for the first wire 366a and the modified effective length Lb2 for the second wire 366b from the modified instruction angle which is obtained by modifying the instructed angle of the joint 362 according to the deviation between the instructed angle and the actual angle. The modified effective lengths La2 and Lb2 are calculated with considering the deviation in the joint angle of the joint 362. Then, the controller 404 calculates the distributed effective length for the first wire 366a from the expected effective length La1 and modified effective length La2 for the first wire 366a. At this time, as the tension of the first wire 366a is larger, the distributed effective length will be near to the effective length La2. That is, as the tension of the first wire 366a is larger, the distributed effective length for the first wire 366a will be more substantially affected by the deviation in the joint 362. The distributed effective length for the second wire 366b is calculated similarly to that for the first wire 366a. As a result, in the first wire 366a and the second wire 366b, the distributed effective length for the wire with a larger tension will be more substantially affected by the deviation in the joint angle the joint 362.

In the controller 404, the operation amounts of the first actuator 368a and the second actuator 368b are calculated from the distributed effective lengths for the first wire 366a and the second wire 366b, respectively. As a result, when the tension of the first wire 366a is larger than the tension of the second wire 366b, the operation amount of the first actuator 368a will be more substantially modified with respect to the deviation in the joint angle of the joint 362 than the operation amount of the second actuator 368b. Conversely, when the tension of the second wire 366b is larger than the tension of the first wire 366a, the operation amount of the second actuator 368b will be more substantially modified with respect to the deviation in the joint angle of the joint 362 than the operation amount of the first actuator 368a.

As described previously, while the robot operates, the load torque applied to the joint 362 varies according to the operation of the robot. When the load torque is applied to the joint 362, the tension of either the first wire 366a or the second wire 366b will increase, while the tension of the other one will decrease. As the load torque of the joint 362 varies every moment, the tensions of the first wire 366a and the tension the second wire 366b also vary every moment. Since the rigidities of the wires vary depending on the tension of the wire, the rigidity of the first wire 366a and the second wire 366b will vary every moment according to the operation of the robot.

When the rigidity of the wire varies, the relationship between the operation amount of the actuator which moves the wire and the amount of change in the joint angle caused by the operation amount also varies. In particular, when the tension of the wire is small, the rigidity of the wire is low and is apt to vary. A delay may occur in the change (so-called responsiveness) of the joint angle with respect to the operation of the actuator, if the operation amount of the actuator is modified substantially with respect to the deviation in the joint angle. As a result, the joint angle may be vibrating. On the other hand, when the tension of the wire is large, the rigidity of the wire is high and stable. The deviation in the joint angle can be rapidly removed by modifying the operation amount of the actuator substantially with respect to the deviation. The joint angle can now be accurately adjusted to an instructed angle.

When the controller 404 calculates the operation amount of the first actuator 368a and the operation amount of the second actuator 368b, the controller 404 adds the deviation in the joint angle more largely to the operation amount of the actuator which moves the wire, whose tension is larger, than to the operation amount of the other actuator, whose tension is smaller. When the deviation in the joint angle of the joint 362 occurs, the controller 404 operates the actuator for the wire with a larger tension substantially with respect to the deviation, while it operates the other actuator for the other wire with a smaller tension slightly with respect to the deviation. That is, the controller 404 causes a wire which is high and stable in rigidity to be moved substantially with respect to the deviation, and causes a wire which is low and unstable in rigidity to be moved slightly with respect to the deviation. Accordingly, the deviation in the joint angle of the joint 362 can be rapidly removed, and the joint angle can be prevented from vibrating.

The controller 404 can appropriately add the deviation caused in the joint angle of the joint 362 to the operation amounts of the first actuator 368a and the second actuator 368b, thereby adjusting the joint angle of the joint 362 accurately to the instructed angle.

Embodiment 1

An embodiment of the present invention will be described with reference to the drawings. The present embodiment applies the technique of the present invention to a humanoid robot.

Figure 4:
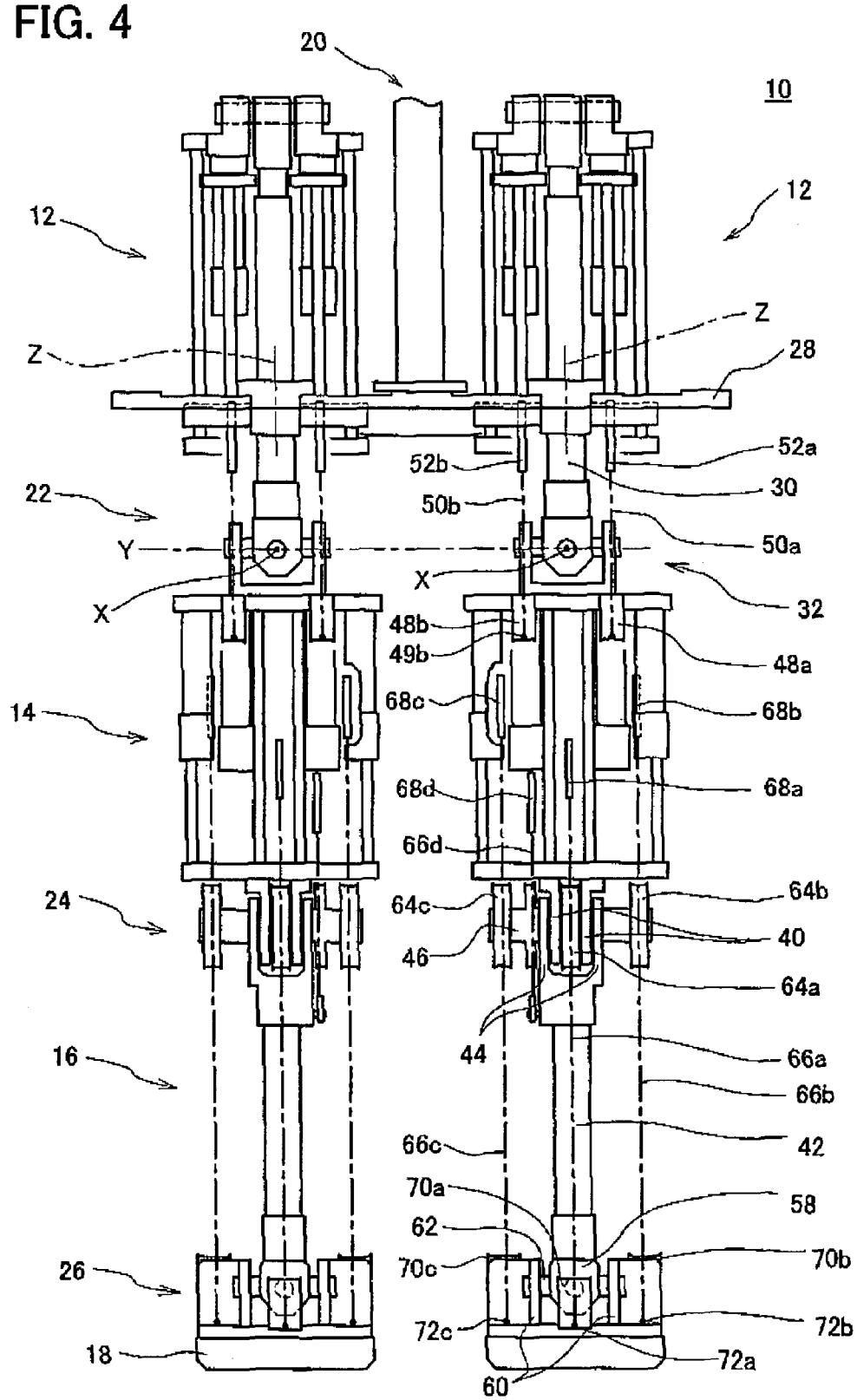
FIG. 4 is a front view of both legs of the robot of the embodiment.
Figure 5:
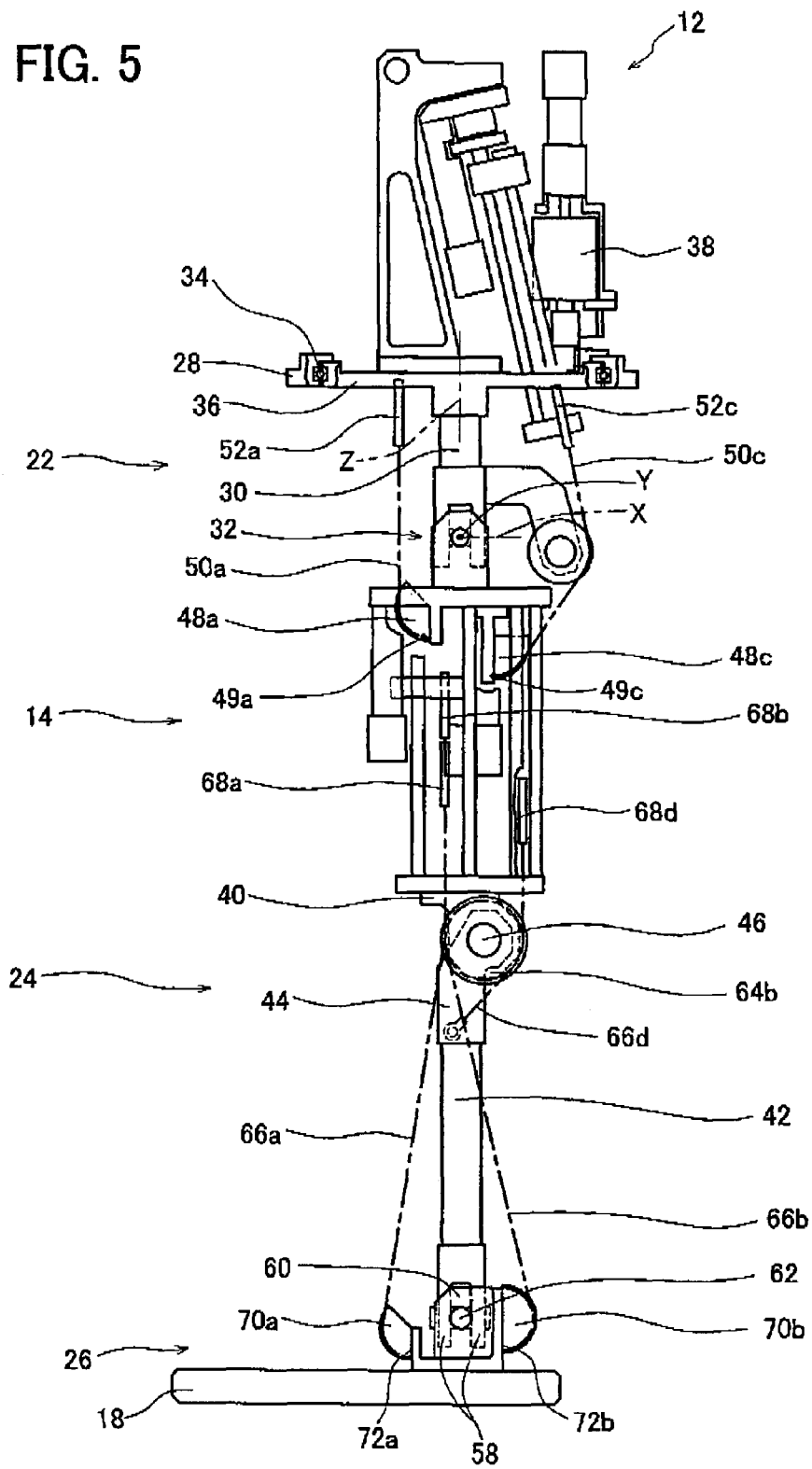
FIG. 5 is a side view of a left leg of the robot of the embodiment
Figure 6:
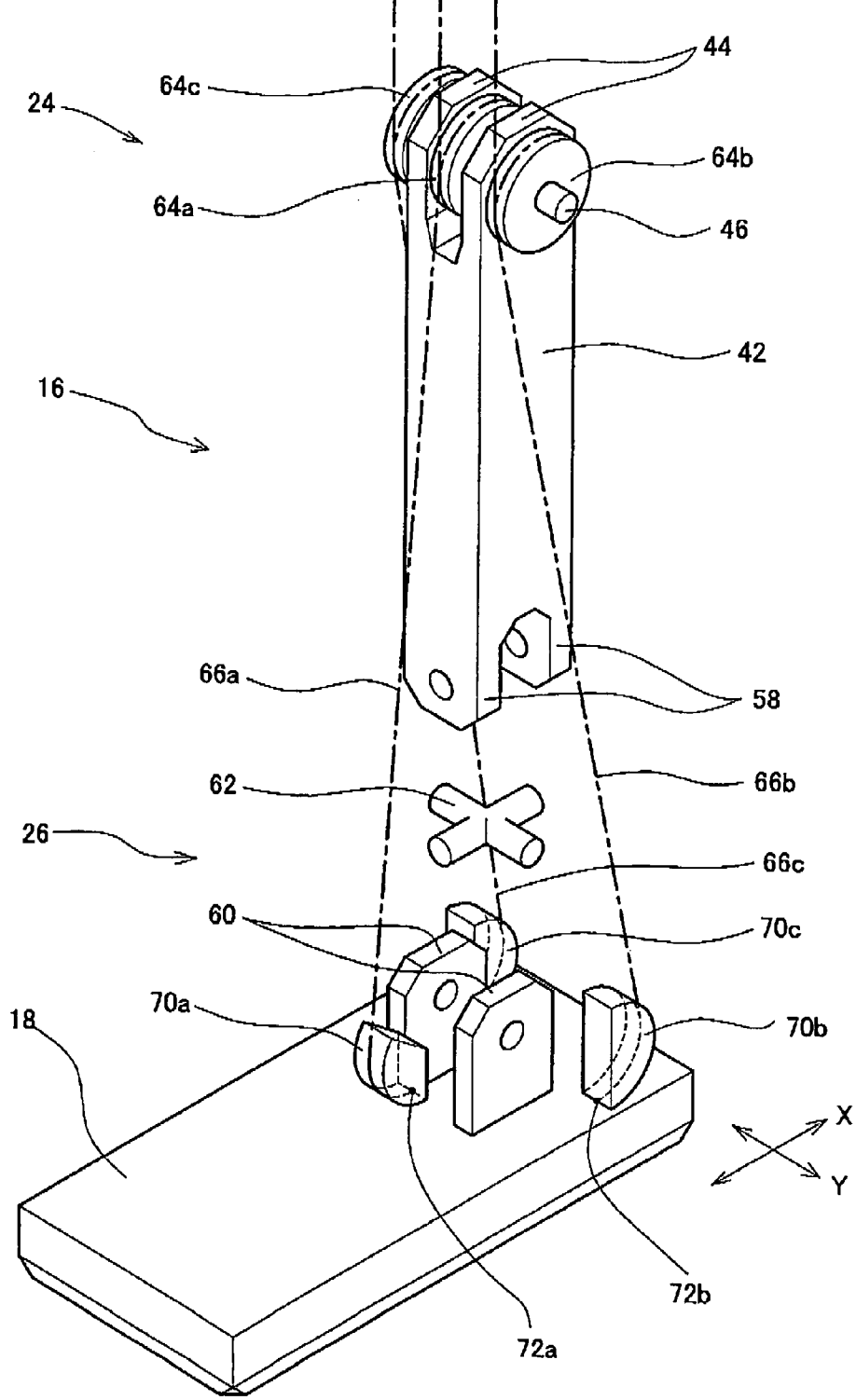
FIG. 6 shows the structure of an ankle joint of the robot of the embodiments.
Figure 7:
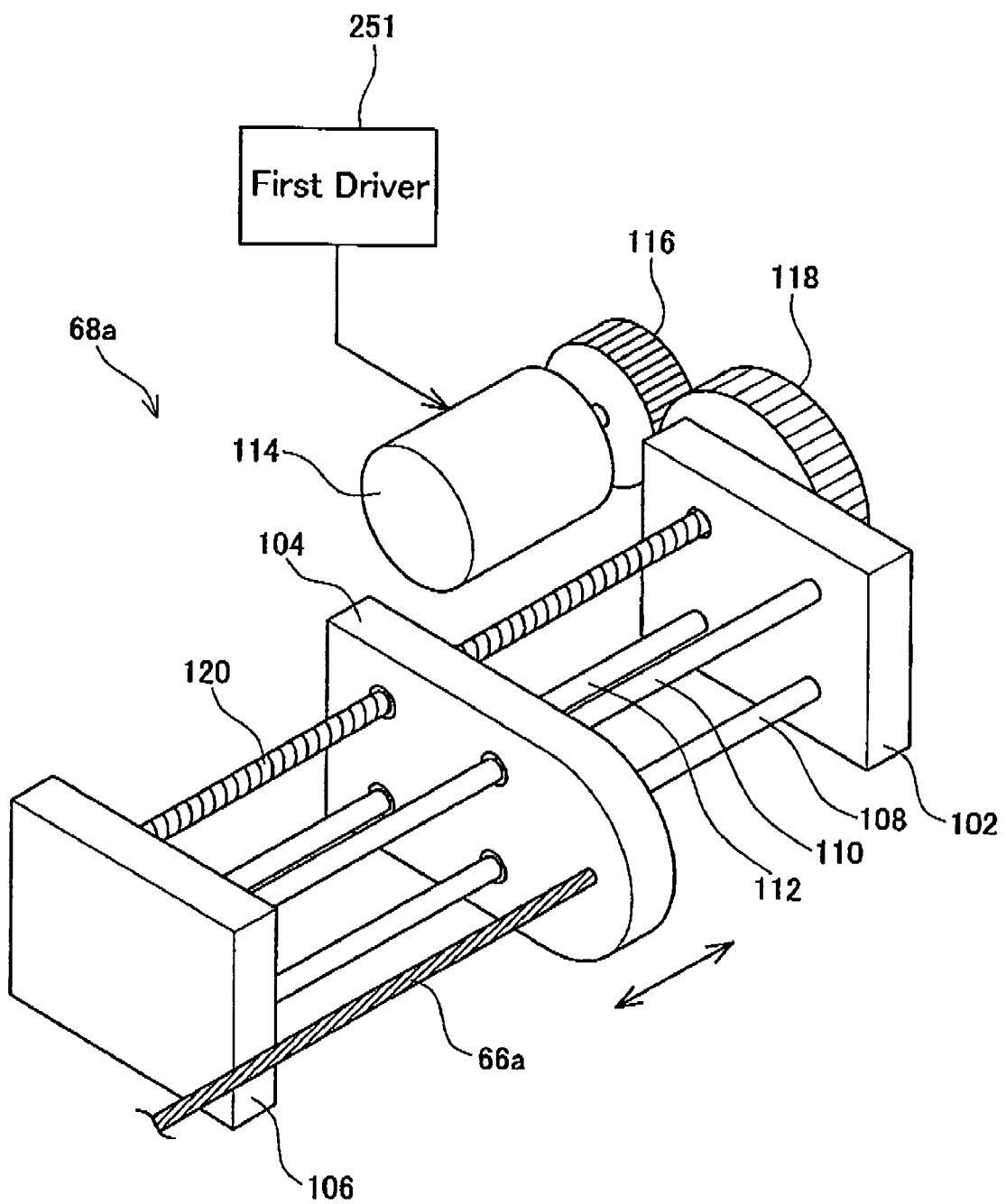
FIG. 7 shows the configuration of an actuator of the robot of the embodiments.

FIG. 4 is a front view of a lower body of a robot 10. FIG. 5 is a side view of the lower body of the robot 10. FIG. 6 is a view showing the structure of an ankle joint FIG. 7 is a view showing the configuration of an actuator. Although not shown, the robot 10 additionally has a head part, an upper body, an upper arm, a lower arm, etc.

In the present embodiment, an anteroposterior direction (traveling direction of the robot 10) of a foot part is defined as an X-axis, a horizontal direction is defined as a Y axis, and a direction in which a lower leg part or a body extends is defined as a Z axis. The axes are orthogonal to each other.

As shown in FIG. 4, the robot 10 in the present embodiment has right and left legs 12. The shape of the right and left legs 12 is mirror-symmetrical. The leg 12 is mainly composed of a thigh part 14, a lower leg (shin) part 16, and a foot part 18. The thigh part 14 and the body part 20 are jointed by a hip joint 22. The thigh part 14 and the lower leg part 16 are jointed by a knee joint 24. The lower leg part 16 and the foot part 18 are jointed by an ankle joint 26.

With reference to FIGS. 4, 5, and 6, the hip joint 22, the knee joint 24, and the ankle joint 26 will be described in order. First, the hip joint 22 will be described. A disk 36 which rotates around the Z axis is attached to a plate-like pelvic part 28 via a bearing 34 (refer to FIG. 5). A pair of right and left disks 36 are provided. A shaft 30 extending from the pelvic part 28 side toward the thigh part 14 (extending in the Z axis direction) is fixed to the center of each disk 36. The shaft 30 rotates around the Z axis with respect to the pelvic part 28.

An upper end of the thigh part 14 is connected to a lower end of a shaft 30 via a universal joint 32. The universal joint 32 permits the thigh part 14 to rotate around the X axis and around the Y axis with respect to the shaft 30.

The hip joint 22 has the shaft 30 which can rotate around the Z axis with respect to the pelvic part 28, and the universal joint 32 which permits the thigh part 14 to rotate around the X axis and around the Y axis with respect to the shaft 30, and constitutes a triaxial joint which is rotatable around each of the X, Y, and Z axes.

Next, the knee joint 24 will be described. Two parallel flanges 40 extend downward at a lower end of each thigh part 14. Two parallel flanges 44 extend upward at an upper end of a shaft 42 constituting each lower leg part 16. The knee joint 24 has a shaft 46 which extends in the Y axis direction through these flanges 40 and 44. The knee joint 24 permits the lower leg part 16 to rotate around the Y axis with respect to the thigh part 14.

Next, the ankle joint 26 will be described. Since FIG. 6 shows the simplified structure of the ankle joint 26, the shape or dimension of the angle joint does not necessarily coincide with an actual shape or actual dimension. Two parallel flanges 58 extend downward at a lower part of the shaft 42 of each lower leg part 16. Two parallel flanges 60 extend upward at the top face of the foot part 18. The flanges 58 of the lower leg part 16 and the flanges 60 of the foot part 18 are jointed by a cross tip universal coupling 62 to constitute a universal joint. The ankle joint 26 permits the foot part 18 to rotate around the X axis and around the Y axis with respect to the lower leg part 24. That is, the ankle joint 26 is a biaxial joint which has the degree of freedom for each of the X and Y axes.

Each joint of the robot 10 is driven using a wire (The rotation of a hip joint around the Z axis excluded. Only this rotation is directly rotated by a motor without using a wire). Each wire has an end connected to a distal side member, and the other end connected to an actuator. The actuator moves each wire back and forth with respect to the distal side member.

As shown in FIGS. 4 and 5, the robot 10 has, for example, a wire 50a and an actuator 52a which moves the wire 50a back and forth, a wire 50b and an actuator 52b which moves the wire 50b back and forth, a wire 50c and an actuator 52c which moves the wire 50c back and forth, etc. These control mainly the operation of the hip joint 22. As shown in FIGS. 4 and 5, the robot 10 has a wire 66a and an actuator 68a which moves the wire 66a back and forth, a wire 66b and an actuator 68b which moves the wire 66b back and forth, a wire 66c and an actuator 68c which moves the wire 66c back and forth, a wire 66d and an actuator 68d which moves the wire 66d back and forth, etc. These mainly control the operation of the knee joint 24 or the ankle joint 26.

Figure 11:
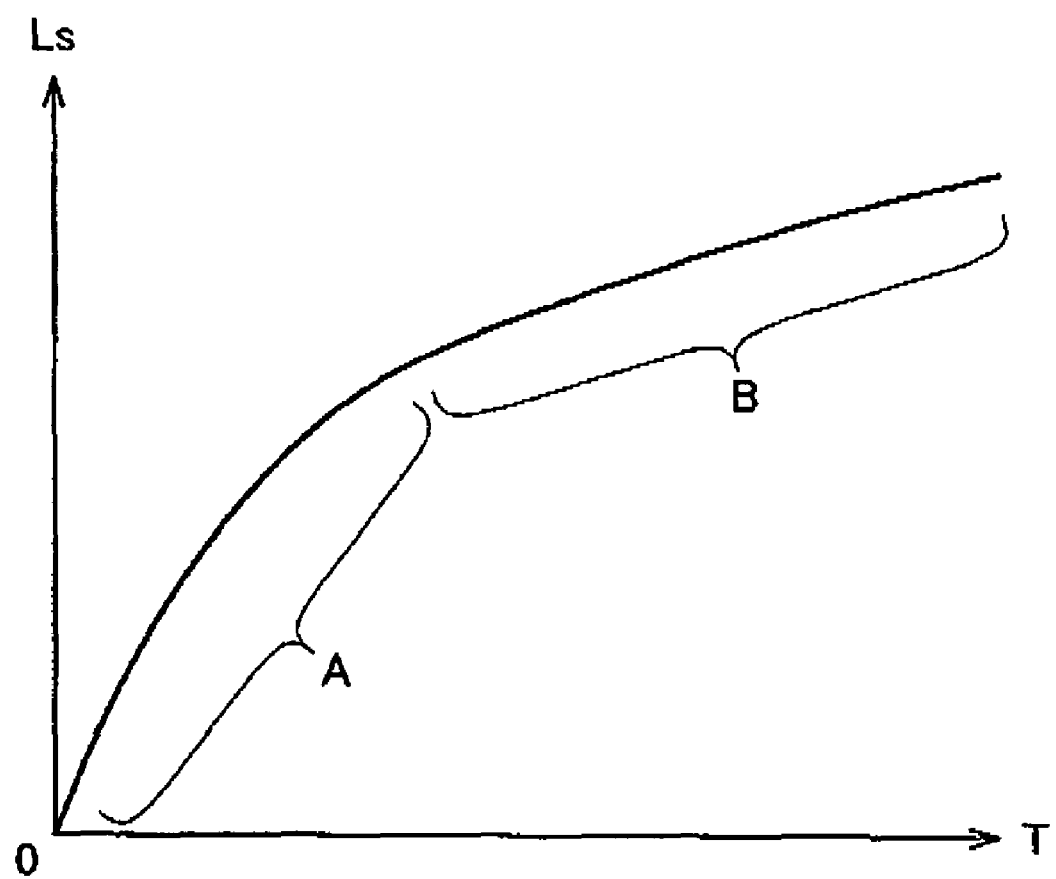
FIG. 11 shows the relationship between the stretch and tension of a wire.

The wires used for the robot 10 have the relationship between tension and stretch as previously described with reference to FIG. 11. That is, the rigidity of each wire changes depending on a caused tension. Particularly, the rigidity is low in a state where a small tension is caused, and as the tension changes, the rigidity is also apt to change.

With reference to FIG. 6, the wires 66a, 66b, and 66c which drive the ankle joint 26 will be described. Wire termination guides 70a, 70b, and 70c are fixed to the foot part 18. Each of the wire termination guides 70a, 70b, and 70c is circular arc-shaped, the central axis of each circular arc extends in the Y axis direction, and the surface of the circular arc has a predetermined width (distance extending along the Y axis). The wire termination guide 70a is on X axis, and is disposed further ahead than the ankle joint 26 in the X axis direction. The circular arc surface of the wire termination guide 70a faces the front direction of the X axis. The wire termination guides 70b and 70c are located further behind than the ankle joint 26 in the X axis direction. The wire termination guide 70b is located outside the ankle joint 26, and the wire termination guide 70c is located inside the ankle joint 26. The circular arc surface of the wire termination guide 70b, 70c faces the rear direction of the X axis.

Lower ends of the three wires 66a, 66b, and 66c are fixed to wire connection points 72a, 72b, and 72c, respectively, of the lower ends of the wire termination guides 70a, 70b, and 70c (the wire connection point 72c is shown in FIG. 4). The other end of each of the wires 66a, 66b, and 66c extends toward the knee joint 24. The wire termination guides 70a, 70b, and 70c prevent the wires 66a, 66b, and 66c from being sharply bent with a small radius of curvature.

By the above configuration, by loosening the wires 66b and 66c in the same way while the wire 66a is pulled toward the knee joint 24, the foot part 18 rotates in one direction around the Y axis of the ankle joint 26, and the tiptoe side (the left in the X axis direction of FIG. 6) of the foot part 18 operates to rise. Otherwise, by pulling the wires 66b and 66c toward the knee joint 24 in the same way while the wire 66a is loosened, the foot part 18 rotates in the other direction around the Y axis of the ankle joint 26, and the heel side (the right in the X axis direction of FIG. 6) of the foot part 18 operates to rise.

Further, by loosening the wire 66c while the wire 66b is pulled toward the knee joint 24, the foot part 18 rotates in one direction around the X axis of the ankle joint 26, and the outside (the right in the Y axis direction of FIG. 6) of the foot part 18 operates to rise. By pulling the wire 66c toward the knee joint 24 while the wire 66b is loosened, the foot part 18 rotates in the other direction around the X axis of the ankle joint 26, and the inside (the left in the Y axis direction of FIG. 6) of the foot part 18 operates to rise.

By combining the above operations, the joint angle of the ankle joint 26 around the X axis and the joint angle of the ankle joint around the Y axis can be independently adjusted by moving the three wires 66a, 66b, and 66c back and forth. In addition, the positions of the wire connection points 72a, 72b, and 72c are not limited to those in the present embodiment.

Next, the wires which control the operation of the knee joint 24 will be described. The operation of the knee joint 24 is adjusted using the wires 66a, 66b, 66c, and 66d. As shown in FIG. 6, three pulleys 64a, 64b, and 64c are arranged alternately with the two flanges 44 at an upper portion of the shaft 42 of the lower leg part 16. The three pulleys 64a, 64b, and 64c are supported so as to be rotatable around a shaft 46 which passes through the flanges 44 in the Y axis direction. The wires 66a, 66b, and 66c are wound around the pulleys 64a, 64b, and 64c, respectively. The wires 66a, 66b, and 66c are separated from the pulleys on the front side of the pulleys 64a, 64b, and 64c. Further, as shown well in FIGS. 4 and 5, the wire 66d is fixed by the flanges 44 around the rear side of the X axis of the knee joint 24.

By the above configuration, by loosening the wire 66d while the three wires 66a, 66b, and 66c are pulled in the same way toward the thigh part 14, the knee joint 24 rotates in one direction around the Y axis, and the knee joint 24 operates to extend. By pulling the wire 66d toward the thigh part 14 while the three wires 66a, 66b, and 66c are loosened in the same way, the knee joint 24 rotates in the other direction around the Y axis, and the knee joint 24 operates to bend. When the three wires 66a, 66b, and 66c are made to simultaneously move back and forth at the same speed, the knee joint 24 can be rotated without rotating the ankle joint 26.

As shown in FIGS. 4 and 5, the actuators 68a, 68b, 68c, and 68d which move the wires 66a, 66b, 66c, and 66d back and forth are disposed in the thigh part 14. In the robot 10, even an actuator for adjusting the rotation angle of the ankle joint 26 as well as the knee joint 24 is disposed in the thigh part 14. Accordingly, the distal side of a leg 12 is configured lightly, and the moment of inertia around the hip joint 22 is suppressed low. The robot 10 can operate the lower leg 12 with a small torque.

Next, the wires which control the operation of the hip joint 22 will be described. As shown in FIGS. 4 and 5, ends of the wires 50a, 50b, and 50c which drive the hip joint 22 are also fixed to lower ends 49a, 49b, and 49c of the wire termination guides 48a, 48b, and 48c. The rotation angle of the hip joint 22 around the X axis and the rotation angle of the hip joint around the Y axis can be independently adjusted by moving wires 50a, 50b, and 50c back and forth, respectively. Further, the disk 36 which is rotatable in the pelvic part 28 is rotated around the Z axis by a motor 38. The motor 38 is fixed to the pelvic part 28. The rotation angle of the hip joint 22 around the Z axis is adjusted by the motor 38.

With reference to FIG. 7, actuators which move the wires back and forth will be described. FIG. 7 shows the actuator 68a which moves the wire 66a back and forth. The actuator 68a has a pair of flanges 102 and 106, and three guide rods 108, 110, and 112 which connect them together. A feed screw 120 is disposed between the pair of flanges 102 and 106. The feed screw 120 is supported to be rotatable, but not to be movable in its axial direction. A movable plate 104 is threadedly engaged with the feed screw 120. The movable plate 104 has the structure of being guided by the guide rods 108, 110, and 112. An end of the wire 66a is fixed to the movable plate 104. The actuator 68a has a motor 114. The motor 114 is connected to the feed screw 120 via a gear 116 and a gear 118.

When the motor 114 rotates, the feed screw 120 rotates. When the feed screw 120 rotates, the movable plate 104 slides along the guide rods and the wire 66a is pulled in or fed out. The rotational amount of the motor 114 is proportional to an amount by which a connecting end of the wire 66a connected to the movable plate 104 moves back and forth. The motor 114 is connected to a first driver 251 described in the latter section, and the operation of the motor 114 is adjusted by the first driver 251.

In the robot 10 the actuators 48b, 48c, 68a, 68b, 68c, and 68d which move the other wires 50b, 50c, 66a, 66b, 66c, and 66d back and forth have the same structure as shown in FIG. 7. In addition, the actuators which move the wires back and forth are not limited to this type.

Next, the controller which controls the operation of the robot 10 will be described. The body part of the robot 10 (whose illustration is omitted) is provided with a controller which controls the operation of the actuators 48b, 48c, 68a, 68b, 68c, and 68d, etc. Hereinafter, taking the ankle joint 26 as an example, a method in which the controller controls the operation of the actuators 68a, 68b, and 68c which operate the ankle joint 26 will be described.

Figure 8:
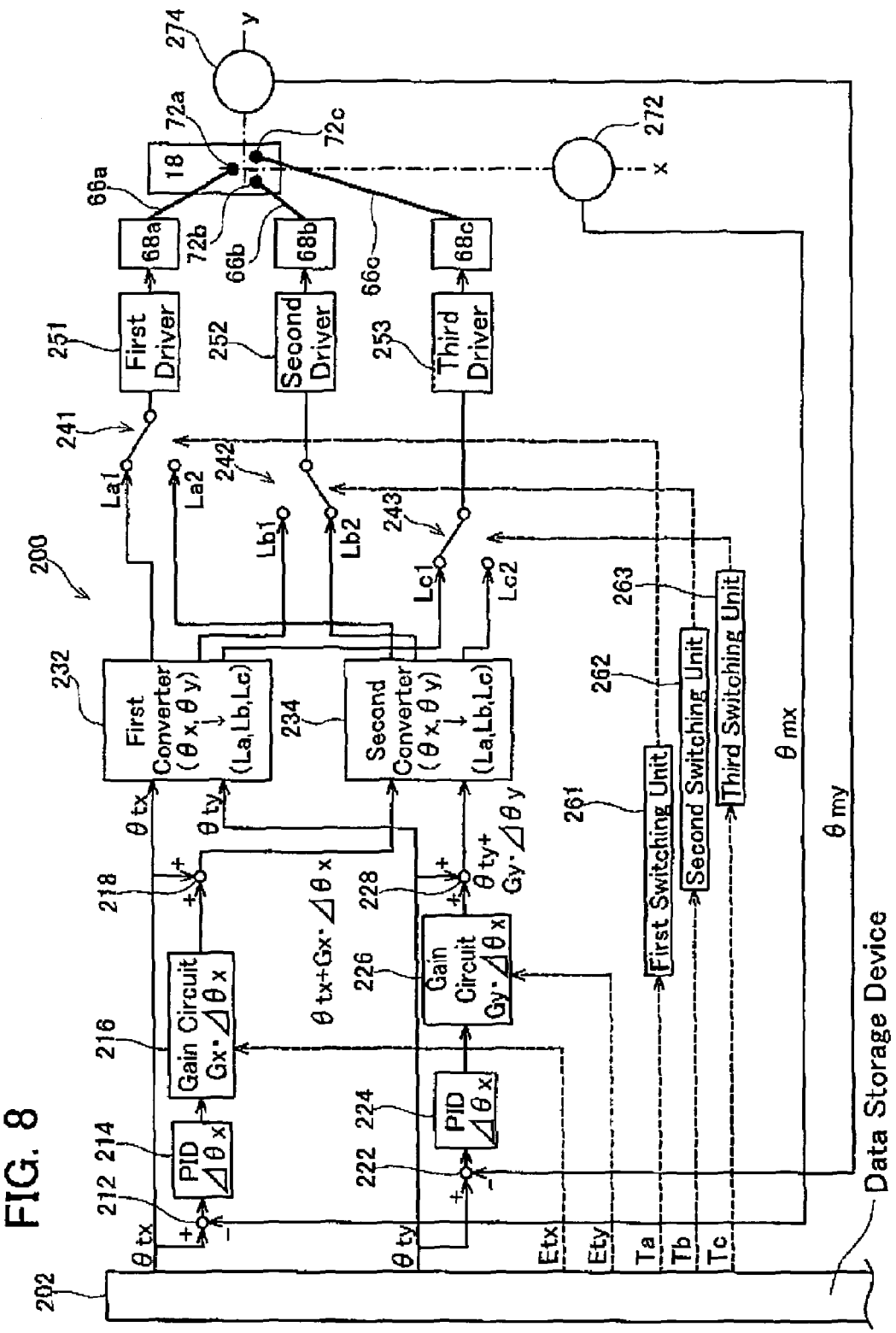
FIG. 8 shows the configuration of the controller of the robot of the embodiment 1.

FIG. 8 shows the configuration of a portion of a controller 200 included in the robot 10. FIG. 8 shows mainly a portion of the controller 200 for controlling the operation of the actuators 68a, 68b, and 68c. The portion of the controller 200 shown in FIG. 8 controls the operation of the actuators 68a, 68b, and 68c arranged in one of the right and left legs 12. The controller 200 further includes a set of components shown in FIG. 8 in order to control the operation of the actuators 68a, 68b, and 68c arranged in the another leg 12.

As shown in FIG. 8, the controller 200 has the data storage device 202. The data storage device 202 stores joint angle data, load torque data, expected tension data, etc., for example.

The joint angle data is data which describes a joint angle (instructed angle) of each joint, when the robot 10 actuates each joint to make a predetermined operation thereof over time. For example, the joint angle data describes time-series data which describe an instructed angle θtx of the ankle joint 26 around the X axis, and time-series data which describe an instructed angle θty of the ankle joint around the Y axis.

The load torque data is data which describes a load torque expected to be applied thereto when the robot actuates each joint to make a predetermined operation thereof over time. The load torque data describes the load torque of each joint in its rotative direction over time. The load torque data describes, for example, an expected load torque Etx of the ankle joint 26 around the X axis and an expected load torque Ety of the ankle joint around the Y axis over time.

The expected tension data is data which describes a tension expected to be generated in each wire when the robot 10 actuates each joint to make a predetermined operation thereof over time. For example, as for the ankle joint 26, the expected tension data describes the expected value of the tension Ta caused in the wire 66a, the expected value of the tension Tb caused in the wire 66b, and the expected value of the tension Tc caused in the wire 66c over time.

Figure 9:
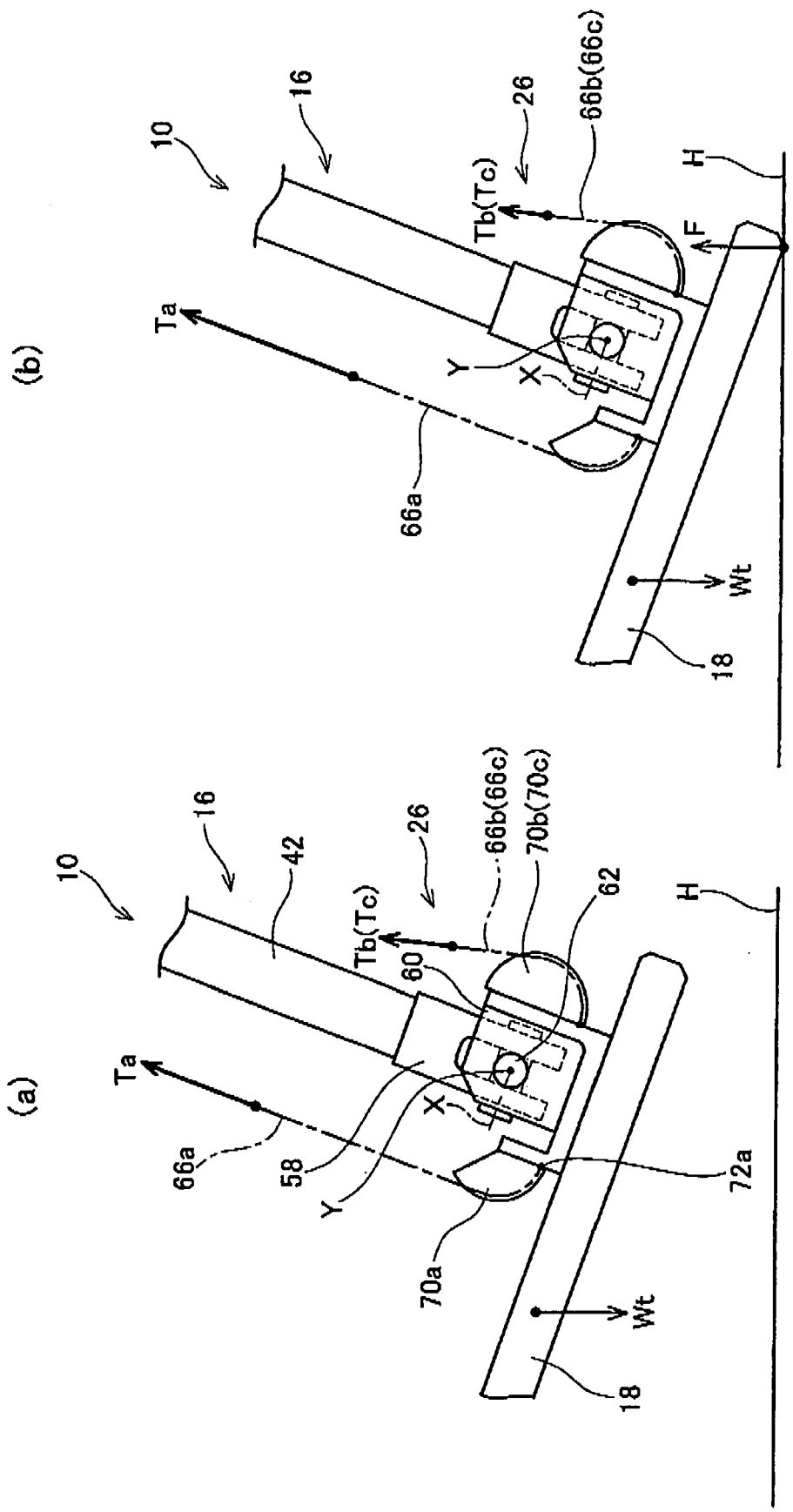
FIG. 9 is a view illustrating a force relating to the ankle joint.

Referring to FIG. 9, taking the ankle joint 26 as example, a load torque applied to the ankle joint 26, and tensions to be caused in the wires 66a, 66b and 66c will be described. FIG. 9(a) shows a state where the foot part 18 is located in the air. FIG. 9(b) shows a state where the foot part 18 makes contact with a ground surface H. It is assumed that the instructed angles (θtx, θty) concerning the ankle joint 26 are equal to each other in a point of time shown in FIG. 9(a), and a point of time shown in FIG. 9(b).

In the state where the foot part 18 is located in the air as shown in FIG. 9(a), for example, the gravity Wt of the foot part 18, etc. acts on the foot part 18. The gravity Wt tends to rotate the ankle joint 26 around the Y axis. Such an external torque (except for torques caused by the wires 66a, 66b, and 66c) which tends to change the joint angle of the ankle joint 26 around the Y axis is referred to as the load torque of the ankle joint 26 around the Y axis. In this state, when the load torque of the ankle joint 26 around the Y axis and the torques applied to the ankle joint 26 around the Y axis caused by the tensions Ta, Tb, and Tc of the wires 86a, 86b, and 86c are balanced with each other in a state where the joint angle of the ankle joint 26 around the Y axis is the instructed angle θty, the joint angle of the ankle joint 26 around the Y axis is maintained at the instructed angle θty.

In the state where the foot part 18 makes contact with the ground surface H as shown in FIG. 9(b), for example, the gravity Wt of the foot part 18, a reaction force F of the foot part 18 from the ground surface H, etc. act on the foot part 18. The gravity Wt and reaction force F tend to rotate the ankle joint 26 around the Y axis. When the load torque of the ankle joint 26 around the Y axis caused by the gravity W, the reaction force F, etc. and the torques applied to the ankle joint 26 around the Y axis caused by the tensions Ta, Tb, and Tc of the wires 86a, 86b, and 86c are balanced with each other in a state where the joint angle of the ankle joint 26 around the Y axis is the instructed angle θty, the joint angle of the ankle joint 26 around the Y axis is maintained at the instructed angle θty.

As apparent from comparison between FIGS. 9(a) and 9(b), even when the instructed angles (θtx, θty) of the ankle joint 26 are equal to each other, the load torque of the ankle-joint 26 around the Y axis changes every moment following the operation of the robot. As the load torque changes every moment, the tension Ta, Tb, and Tc of the wires 66a, 66b, and 66c also need to change every moment. This is not limited to the ankle joint 26, but is similarly applied to about each of the other joints.

When the tension of each of the wires 66a, 66b, and 66c changes, each of the wire 66a, 66b, and 66c will stretch according to the tension change. As each of the wires 66a, 66b, and 66c stretches, the joint angle of the ankle joint 26 changes even when the actuator 68a, 68b, or 68c which moves each wire back and forth does not operate. In other words, it is necessary to calculate the operation amount of each of the actuators 68a, 68b, and 68c in consideration of the extension of each of the wires 66a, 66b, and 66c.

The robot 10 previously grasps the load torque of each joint which changes every moment following its own operation, and the tension of each wire which changes every moment following its own operation.

As shown in FIG. 8, the controller 200 has a first converter 232. The first converter 232 inputs the instructed angles (θtx, θty) of the ankle joint 26 around the X and Y axes, and calculates and outputs expected effective lengths La1, Lb1, and Lc1 for the wires 66a, 66b, and 66c, respectively. The first converter 232 corresponds to the first converter 432 shown in FIG. 3. The first converter 232 calculates the effective length for each wire similarly to the first converter 432 shown in FIG. 3. When the effective length for each wire is adjusted by the expected effective lengths La1, Lb1, and Lc1 calculated from the instructed angles (θtx, θty), the joint angles of the ankle joint 26 around the X and Y axes will be adjusted to the instructed angles (θtx, θty).

The controller 200 has a second converter 234. The second converter 234 itself is the same as the first converter 232.

The controller 200 has a first differentiator 212, a first proportional integral derivative control (PID control) circuit 214, a first gain circuit 216, and a first adder 218. The first differentiator 212, the first PID control circuit 214, the first gain circuit 216, and the first adder 218 are connected in series, and the series circuit connects the data storage device 202 with the second converter 234.

The controller 200 has a second differentiator 222, a second proportional integral derivative control (PID control) circuit 224, a second gain circuit 226, and a second adder 228. The second differentiator 222, the second PID control circuit 224, the first gain circuit 226, and the first adder 228 are connected in series, and the series circuit connects the data storage device 202 with the second converter 234. The first differentiator 212 and the second differentiator 222 are the same as each other. Similarly, the first PID control circuit 214 and the second PID control circuit 224 are the same as each other, the first gain circuit 216 and the second gain circuit 226 are the same as each other, the first adder 218 and the second adder 228 are the same as each other.

As shown in FIG. 8, the first gain circuit 216 and the second gain circuit 226 are directly connected even to a data storage device 216. The first adder 218 and the second adder 228 are directly connected even to the data storage device 216.

The controller 200 has a first encoder 272 which detects an actual joint angle (actual angle) θmx of the ankle joint 26 around the X axis, and a second encoder 274 θmy which detects an actual joint angle (actual angle) θmx of the ankle joint 26 around the Y axis. The first encoder 272 is connected to the first differentiator 212. The second encoder 274 is connected to the second differentiator 222. Although not shown in FIGS. 4, 5, and 6, the first encoder 272 and the second encoder 274 are disposed in the vicinity of the ankle joint 26. A set of the first encoder 272 and the second encoder 274 are disposed in each of the right and left legs 12.

The first differentiator 212 inputs an instructed angle θtx of the ankle joint 26 around the X axis from the data storage device 202, and inputs an actual angle θmx of the ankle joint 26 from the first encoder 272, and outputs a deviation angle (θtx−θmx) therebetween.

The first PD control circuit 214 inputs the deviation angle (θtx−θmx) from the first differentiator 212, and outputs a modified deviation angle Δθx which is modified by increasing and decreasing the deviation angle. The first PID control circuit 214 calculates the modified deviation angle Δθx in a way similar to the PID control circuit 414 shown in FIG. 2.

The first gain circuit 216 inputs the modified deviation angle Δθx from the first PID control circuit 214, inputs a load torque Etx of the ankle joint 26 from the data storage device 202, and outputs an amplified deviation angle Gx·Δθx. This coefficient Gx is a coefficient for amplifying the modified deviation angle Δθ. The first gain circuit 216 calculates the amplified deviation angle Gx·Δθx in a way similar to the gain circuit 416 described in Feature 1.

The first adder 218 inputs the instructed angle θtx of the ankle joint 26 from the data storage device 202, inputs the amplified deviation angle Gx·Δθx from the first gain circuit 216, and outputs a modified instruction angle (θtx+Gx·Δθx) obtained by adding the instructed angle θtx to the amplified deviation angle Gx·Δθx. The modified instruction angle (θtx+Gx·Δθx) output by the first adder 218 is an angle which is obtained by modifying the instructed angle θtx of the ankle joint 26 around the Y axis according to the deviation between the instructed angle θtx and the actual angle θtm. The magnitude of the modification is adjusted so that a larger load torque Etx of the ankle joint 26 around Y axis may result in a larger magnitude of modification.

The second differentiator 222, the second PID control circuit 224, the second gain circuit 226, and the second adder 228 perform the same processing as that in the ankle joint 26 around the Y axis. The second adder 228 outputs the modified instruction angle (θty+Gy·Δθy) of the ankle joint 26 around the Y axis.

The second converter 234 inputs the modified instruction angles (θtx+Gx·Δθx, θty+Gy·Δθy) of the ankle joint 26 around the X and Y axes from the first adder 218 and the second adder 228, and calculates and outputs expected effective lengths La2, Lb2, and Lc2 for the wires 66a, 66b, and 66c, respectively. When the effective length for each wire is adjusted by the expected effective lengths La2 Lb2, and Lc2 calculated from the instructed angles (θtx, θty), the joint angles of the ankle joint 26 around the X and Y axes will be adjusted to the modified instruction angles (θtx+Gx·Δθx, θty+Gy·Δθy).

The controller 200 has a first driver 251 which controls the operation of the actuator 68a, a second driver 252 which controls the operation of the actuator 68b, and a third driver 253 which controls the operation of the actuator 68c.

The controller 200 has a first selector 241, a second selector 242, and a third selector 243. The first selector 241 is interposed in a circuit which connects the first converter 232 and the second converter 234 to the first driver 251. The second selector 242 is interposed in a circuit which connects the first converter 232 and the second converter 234 to the second driver 252. The third selector 243 is interposed in a circuit which connects the first converter 232 and the second converter 234 to the third driver 253. The first selector 241 is constructed to selectively connect one of the first converter 232 and the second converter 234 to the first driver 251. The second selector 242 is constructed to selectively connect one of the first converter 232 and the second driver 252 to the second driver 252. The third selector 243 is constructed to selectively connect one of the first converter 232 and the second converter 234 to the third driver 253.

The controller 200 has a first switching unit 261, a second switching unit 262, and a third switching unit 263. The first switching unit 261 is connected to the first selector 241. The second switching unit 262 is connected to the second selector 242. The third switching unit 263 is connected to the third selector 243. Further, the first switching unit 261, the second switching unit 262, and the third switching unit 263 are connected even to the data storage device 202.

The first switching unit 261 inputs an expected tension Ta of the wire 66a from the data storage device 202, and switches the first selector 241 on the basis of the value of the expected tension Ta of the wire 66a. When the expected tension Ta of the wire 66a is smaller than a predetermined value, the first switching unit 261 switches the first selector 241 so as to connect the first converter 232 to the first driver 251. Further, when the expected tension Ta of the wire 66a is larger than a predetermined value, the first switching unit 261 switches the first selector 241 so as to connect the second converter 234 to the first driver 251. Accordingly, when the tension of the wire 66a is small, the expected effective length La1 is input to the first driver 251 from the first converter 232. And, when the tension of the wire 66a is large, the modified effective length La2 is input to the first driver 251 from the second converter 234.

Similarly, the second switching unit 262 switches the second selector 242 on the basis of the expected tension Tb of the wire 66b. That is, when the tension of the wire 66b is small, the expected effective length Lb1 is input to the second driver 252 from the first converter 232. And, when the tension of the wire 66b is large, the modified effective length Lb2 is input to the second driver 252 from the second converter 234. Similarly, the third switching unit 263 switches the third selector 243 on the basis of the value of the expected tension. To of the wire 66c. That is, when the tension of the wire 66c is small, the expected effective length Lc1 is input to the third driver 253 from the first converter 232. And, when the tension of the wire 66c is large, the modified effective length Lc2 is input to the third driver 253 from the second converter 234.

The first driver 251 calculates an operation amount of the actuator 68a on the basis of the inputted one of the expected effective length La1 and modified effective length La2 for the wire 66a, and operates the actuator 68a by the calculated operation amount. The first driver 251 stores a reference relationship between a rotation angle of the motor 114 of the actuator 68a and a length by which the wire 66a is moved back and forth by the operation of the actuator. The first driver 251 calculates the operation amount of the actuator 68a on the basis of the input effective length for the wire 66a and a stored reference relationship.

Similarly, the second driver 252 calculates an operation amount of the actuator 68b, and operates the actuator 68b by the calculated operation amount. The third driver 253 calculates an operation amount of the actuator 68c, and operates the actuator 68 by the calculated operation amount.

With the configuration as described above, the controller 200 calculates the targeted expected effective lengths La1, Lb1, and Lc1 for the wires 66a, 66b, and 66c from the instructed angles of the ankle joint 26 around the X and Y axes. The expected effective lengths La1, Lb1, and Lc1 are calculated without adding deviations caused in the joint angle of the ankle joint 26. Further, the controller 200 calculates modified instruction angles around the X and Y axes, which are obtained by modifying the instructed angles of the ankle joint 26 on the basis of deviations between the instructed angles and actual angles, and calculates targeted modified effective lengths La2, Lb2, and Lc2 for the wires 66a, 66b, and 66c from the calculated modified instruction angles around the X and Y axes. The modified effective lengths La2, Lb2, and Lc2 are calculated with deviations caused in the joint angle of the ankle joint 26 being added thereto. At this time, as the load torque of the ankle joint 26 is larger, the modified effective lengths are calculated with deviations being more largely added thereto.

In the controller 200, when the tension of the wire 66a is small, the operation amount of the actuator 68a is calculated from the expected effective length La1. That is, when the tension of the wire 66a is small, the operation amount of the actuator 68a is calculated without respect to deviations caused in the joint angle of the ankle joint 26. On the other hand, when the tension of the wire 66a is large, the operation amount of the actuator 68a is calculated from the modified effective length La2. That is, when the tension of the wire 66a is large, the operation amount of the actuator 68a is calculated with respect to the deviations caused in the joint angle of the ankle joint 26. Each operation amounts of the other actuators 68b, 68c is calculated similarly to the above mentioned calculation. As a result, among the actuators 68a, 68b, and 68c, for only one (or some) of the actuators which moves a wire with a large tension, the operation amount thereof is calculated with respect to the deviations caused in the joint angle of the ankle joint 26. Furthermore, as the load torque of the ankle joint 26 is larger, the deviations are modified so as to be larger than the actual value, and the operation amount of the actuator is calculated with respect to the modified deviations.

While the robot 10 operates, the load torque of the ankle joint 26 changes variously following the operation of the robot 10, and consequently the tensions of the wires 66a, 66b, and 66c also change variously therewith. Since the rigidity of the wires 66a, 66b, and 66c change depending on the tensions of the wires 66a, 66b, and 66c, the rigidity of the wires 66a, 66b, and 66c change every moment following the operation of the robot 10.

When deviations are caused in the joint angle of the ankle joint 26, the controller 200 operates, with respect to the deviation, actuators for wires whose tensions are larger, and operates, without respect to the deviation, actuators for wires whose tensions are smaller. That is, the controller 200 causes wires which are high and stable in rigidity to be moved in accordance with the deviations, and causes wires which are low and unstable in rigidity no to be moved in accordance with the deviations. At this time, for the actuators to be operated, they are operated more largely with respect to the deviation, as the load torque of the ankle joint 26 is larger. That is, the actuators made to move back and forth are operated more largely with respect to the deviations, as the load torque of the ankle joint 26 is larger and as the deviations caused in the joint angle of the ankle joint 26 are larger. Accordingly, the deviation caused in the joint angle of the ankle joint 26 can be rapidly removed, and the joint angle can be prevented from being vibrating.

The controller 200 can appropriately add the deviation caused in the joint angle of the ankle joint 26 to the operation amounts of the actuators 68a, 68b, and 68c, thereby adjusting the joint angle of the ankle joint 26 correctly to the instructed angle.

Although mainly the ankle joint 26 has been described hitherto, each of the other joints of the robot 10 performs the same processing operation. The robot 10 can continue to accurately control the joint angle of each joint, and can accurately perform an operation instructed by the joint angle data.

Even when the deviation in the joint angle occurs, the robot 10 is adapted such that a wire with a small tension is not operated selectively. Accordingly, the deviation in the joint angle can be more largely added to the operation amount of actuators which move wires back and forth (or, a feedback gain can be increased), even when some wires have small tensions. Accordingly, it becomes unnecessary to maintain the tension of all wires to be large. It is possible to reduce loads applied to the wires and the joints, and possible to reduce the power consumption of the actuators.

Embodiment 2

Figure 10:
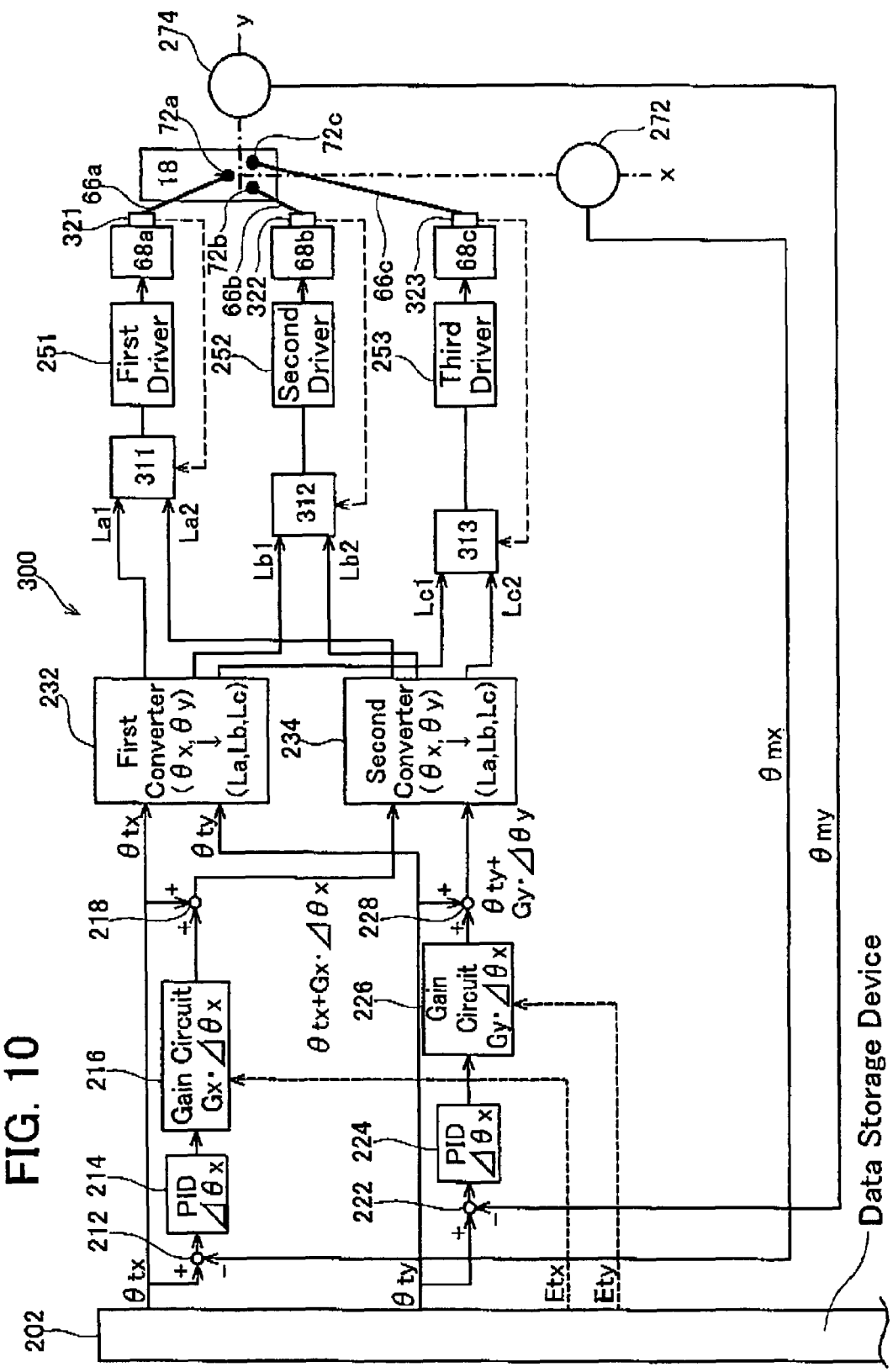
FIG. 10 shows the configuration of the embodiment 2.

The robot 10 can also use a controller 300 shown in FIG. 10 instead of the controller 200. Hereinafter, the controller 300 will be described. Here, in order to avoid repeated description, points different from those of the controller 200 will mainly be described.

The controller 300 has a first variable distributor 311, a second variable distributor 312, and a third variable distributor 313. The first variable distributor 311 is connected to the first converter 232, the second converter 234, and the first driver 251. The second variable distributor 312 is connected to the first converter 232, the second converter 234, and the second driver 252. The third variable distributor 313 is connected to the first converter 232, the second converter 234, and the second driver 253.

The controller 300 has a tension sensor 321 which measures a tension caused in the wire 66a, a second tension sensor 322 which measures a tension caused in the wire 66b, and a third tension sensor 323 which measures a tension caused in the wire 66c. The first tension sensor 321 is connected to the first variable distributor 311, and outputs a measured value of the tension caused on the wire 66a to the first variable distributor 311. The second tension sensor 322 is connected to the second variable distributor 312, and outputs a measured value of the tension caused in the wire 66b to the second variable distributor 312. The third tension sensor 323 is connected to the third variable distributor 313, and outputs a measured value of the tension caused in the wire 66c to the third variable distributor 313.

The first variable distributor 311 inputs the expected effective length La1 outputted by the first converter 232, and inputs the modified effective length La2 outputted by the second converter 234. And, the first variable distributor 311 calculates and outputs distributed effective lengths from the input expected effective length La1 input and modified effective length La2. The first variable distributor 311 calculates the distributed effective length according to a calculating expression descried below.

(Distributed effective length)=$La1+(La2-La1) \cdot k$ k of the above expression is a coefficient of $0 \text{ (zero)} \leq k \leq 1$. The first variable distributor 311 sets the above coefficient k on the basis of the tension of the wire 66a inputted from the first tension sensor 321. Especially, the coefficient k is set so as to be proportional to the input tension of the wire 66a. Accordingly, as the tension of wire 66a is larger, the first variable distributor 311 outputs the distributed effective length which has a nearer value to the modified effective length La2 output by the second converter 234.

Similarly to the first variable distributor 311, the second variable distributor 312 calculates and outputs the distributed effective length for the wire 66b, and the third variable distributor 313 calculates and outputs the distributed effective length for the wire 66c.

The first driver 251 calculates an operation amount of the actuator 68a from the distributed effective length outputted by the first variable distributor 311, and operates the actuator 68a by the calculated operation amount. The second driver 252 calculates an operation amount of the actuator 68b from the distributed effective length outputted by the second variable distributor 312, and operates the actuator 68b by the calculated operation amount. The third driver 253 calculates an operation amount of the actuator 68c from the distributed effective length output by the third variable distributor 313, and operates the actuator 68c by the calculated operation amount.

With the configuration as described above, the controller 300 calculates the operation amounts of the actuators 68a, 68b, and 68c from the distributed effective lengths for the wires 66a, 66b, and 68c, respectively. For each of the wires 66a, 66b, and 68c, as the tension of a wire which is larger, the deviations caused in the joint angle of the ankle joint 26 will be added more largely to the operation amount of the actuator that moves the wire back and forth.

When deviations are caused in the joint angle of the ankle joint 26, the controller 300 operates actuators for wires whose tensions are larger more largely with respect to the deviation, and operates actuators for wires whose tension are small slightly with respect to the deviation. That is, the controller 200 causes wires which are high and stable in rigidity to be moved more largely with respect to the deviations, and causes wires which are low and unstable in rigidity not to be moved much with respect to the deviation. Accordingly, the deviation caused in the joint angle of the ankle joint 26 can be rapidly removed, and the joint angle can be prevented from vibrating.

A robot using the controller 300 can appropriately add the deviation caused in the joint angle of the ankle joint 26 to the operation amounts of the actuators 68a, 68b, and 68c, thereby adjusting the joint angle of the ankle joint 26 accurately to the instructed angle.

Specific examples of embodiments of the present invention were described above, but these examples merely illustrate some possibilities of the invention and do not restrict the claims thereof. The art set forth in the claims includes various transformations and modifications of the specific examples explained above.

The wires are not limited to those made of metal. For example, wires (yams) may be made of polymeric fibers.

A robot may further include a device for calculating a load torque of each joint from stored joint angle data. The movement of a robot can be calculated from time-series data on the instructed angle concerning each joint described in the joint angle data. By calculating the movement of a robot, a load torque of each joint can be calculated.

Furthermore, the technical elements disclosed in the present specification or figures may be utilized independently or in various combinations, and are not limited to the combinations set forth in the claims at the time of filing of the application. Further, the purpose of the example illustrated by the present specification and drawings is to satisfy multiple objectives simultaneously, and satisfying any one of those objectives gives technical value and utility to the present invention.

The invention claimed is:

1. A robot, comprising:
    a body side member;
    a distal side member rotatably jointed to the body side member;
    a first wire, an end of the first wire being connected to a portion of the distal side member located in one side of a rotation center, wherein the first wire rotates the distal side member in a first direction when the first wire is pulled;
    a first actuator to move the other end of the first wire back and forth;
    a second wire, an end of the second wire being connected to a portion of the distal side member located in the other side of the rotation center, wherein the second wire rotates the distal side member in a second direction when the second wire is pulled;
    a second actuator to move the other end of the second wire back and forth;
    a first controller to instruct an operation amount to the first actuator, wherein the first controller calculates a first modified instruction angle by modifying an instructed rotation angle of the distal side member based upon a deviation between the instructed rotation angle and an actual rotation angle of the distal side member, and calculates the operation amount of the first actuator based upon the first modified instruction angle;

a second controller to instruct an operation amount to the second actuator, wherein the second controller calculates a second modified instruction angle by modifying the instructed rotation angle of the distal side member based upon the deviation between the instructed rotation angle and the actual rotation angle of the distal side member, and calculates the operation amount of the second actuator based upon the second modified instruction angle; and an adjustor to adjust, in accordance with a torque required to maintain the rotation angle of the distal side member at the instructed rotation angle, a magnitude of modification performed by the first controller and/or the second controller.

2. A robot as set forth in claim 1, further comprising:

a storage device for storing an expected value of the torque required for maintaining the actual rotation angle of the distal side member at the instructed rotation angle.

3. A robot, comprising:

a body side member;

a distal side member rotatably jointed to the body side member;

a first wire, an end of the first wire being connected to a portion of the distal side member located in one side of a rotation center, wherein the first wire rotates the distal side member in a first direction when the first wire is pulled;

a first actuator to move the other end of the first wire back and forth;

a second wire, an end of the second wire being connected to a portion of the distal side member located in the other side of the rotation center, wherein the second wire rotates the distal side member in a second direction when the second wire is pulled;

a second actuator to move the other end of the second wire back and forth;

a first controller to instruct an operation amount to the first actuator, wherein the first controller calculates a first modified instruction angle by modifying an instructed rotation angle of the distal side member based upon a deviation between the instructed rotation angle and an actual rotation angle of the distal side member, and calculates the operation amount of the first actuator based upon the first modified instruction angle;

a second controller to instruct an operation amount to the second actuator, wherein the second controller calculates a second modified instruction angle by modifying the instructed rotation angle of the distal side member based upon the deviation between the instructed rotation angle and the actual rotation angle of the distal side member, and calculates the operation amount of the second actuator based upon the second modified instruction angle; and an adjustor to adjust a magnitude of modification performed by the first controller to be larger than a magnitude of the modification performed by the second controller when the tension of the first wire is larger than the tension of the second wire, and to adjust the magnitude of the modification performed by the second controller to be larger than the magnitude of the modification performed by the first controller when the tension of the second wire is larger than the tension of the first wire.

4. A robot as set forth in claim 3, wherein, the adjustor adjusts the magnitude of the modification performed by either the first controller or the second controller to be zero.

5. A robot as set forth in claim 3, wherein, the adjustor adjusts the magnitude of the modification performed by the first controller to be proportional to the tension of the first wire, and adjusts the magnitude of the modification performed by the second controller to be proportional to the tension of the second wire.

6. A robot as set forth in claim 3, further comprising, a storage device for storing an expected value of the tension of the first wire and/or the second wire.

7. A robot as set forth in claim 3, further comprising, a sensor for measuring the tension of the first wire and/or the second wire.

* * * * *